United States Patent
Latheef et al.

(10) Patent No.: US 12,446,110 B2
(45) Date of Patent: Oct. 14, 2025

(54) METHOD AND APPARATUS FOR HANDLING MULTICAST BROADCAST SERVICE IN WIRELESS COMMUNICATION SYSTEM

(71) Applicant: Samsung Electronics Co., Ltd., Suwon-si (KR)

(72) Inventors: Fasil Abdul Latheef, Calicut (IN); Vinay Kumar Srivastava, Bengaluru (IN); Sriganesh Rajendran, Chennai (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 18/019,925

(22) PCT Filed: Aug. 5, 2021

(86) PCT No.: PCT/KR2021/010352
§ 371 (c)(1),
(2) Date: Feb. 6, 2023

(87) PCT Pub. No.: WO2022/031081
PCT Pub. Date: Feb. 10, 2022

(65) Prior Publication Data
US 2023/0292400 A1    Sep. 14, 2023

(30) Foreign Application Priority Data

Aug. 6, 2020 (IN) .............................. 202041033762
Jul. 29, 2021 (IN) ............................ 2020 41033762

(51) Int. Cl.
*H04W 76/40* (2018.01)
*H04W 48/10* (2009.01)
*H04W 48/20* (2009.01)

(52) U.S. Cl.
CPC .......... *H04W 76/40* (2018.02); *H04W 48/10* (2013.01); *H04W 48/20* (2013.01)

(58) Field of Classification Search
None
See application file for complete search history.

(56) References Cited

U.S. PATENT DOCUMENTS 10,075,937 B2    9/2018  Zhang et al.
11,832,277 B2 *  11/2023  Byun ................... H04W 76/40
(Continued)

FOREIGN PATENT DOCUMENTS

| KR | 10-1876336 B1 | 7/2018 |
| KR | 10-2019-0082177 A | 7/2019 |
| WO | 2019/101104 A1 | 5/2019 |

OTHER PUBLICATIONS

CATT, KI #1, New Sol: MBS session joining via PDU session establishment and modification procedures, SA WG2 Meeting #S2-139E, S2-2004498, Jun. 1-12, 2020, Elbonia.
(Continued)

*Primary Examiner* — Hong S Cho
(74) *Attorney, Agent, or Firm* — Jefferson IP Law, LLP

(57) ABSTRACT

The disclosure is related to a method performed by a network entity in a wireless communication system. The method may include: receiving, from a terminal, a message indicating that the terminal joins or leaves a multicast and broadcast service (MBS) session using non access stratum (NAS) signaling; and transmitting, to a base station, information indicating that the terminal is to join or leave the MBS session based on the message.

12 Claims, 15 Drawing Sheets

(56) References Cited

U.S. PATENT DOCUMENTS

| | | |
|---|---|---|
| 2020/0162855 A1 | 5/2020 | Li et al. |
| 2020/0205174 A1 | 6/2020 | Prasad et al. |
| 2023/0096763 A1* | 3/2023 | Vesely .................. H04W 76/11 |
| | | 370/312 |
| 2023/0300572 A1* | 9/2023 | Ling ....................... H04W 4/06 |
| | | 370/312 |
| 2023/0319514 A1* | 10/2023 | Kim ....................... H04W 4/08 |
| | | 370/312 |

OTHER PUBLICATIONS

3rd Generation Partnership Project; Technical Specification Group Services and System Aspects;Study on architectural enhancements for 5G multicast-broadcast services. Jun. 2020.

3rd Generation Partnership Project; Technical Specification Group Radio Access Network; Evolved Universal Terrestrial Radio Access (E-UTRA) and Evolved Universal Terrestrial Radio Access Network(E-UTRAN); Overall description;Stage 2, (Release 16). Jul. 2020.

European Search Report dated Aug. 17, 2023, issued in European Application No. 21852374.4.

Ericsson, 'KI#6, New Solution: Support Local MBS Service'—S2-2004501, Jun. 15, 2020.

3GPP; Study on architectural enhancements for 5G multicast-broadcast services (Release 17), 3GPP TR 23.757 V0.4.0, Jun. 22, 2020.

Indian Office Action dated Mar. 10, 2022, issued in Indian Patent Application No. 202041033762.

European Office Action dated Jun. 25, 2024, issued in European Application No. 21852374.4.

\* cited by examiner

[Fig. 1]
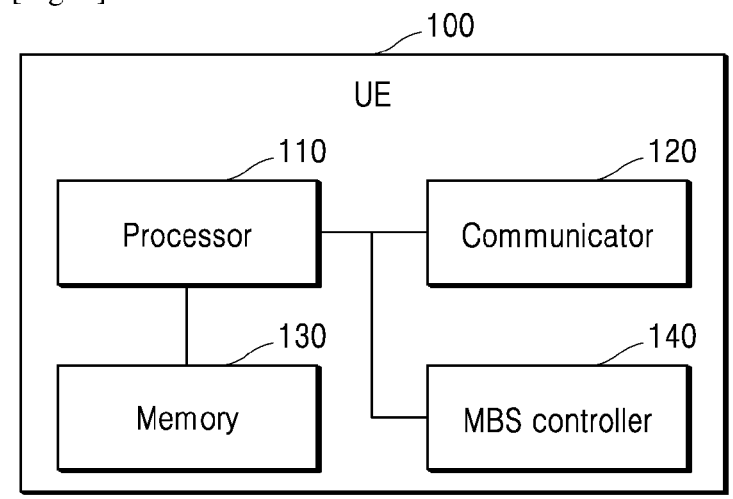
[Fig. 2]
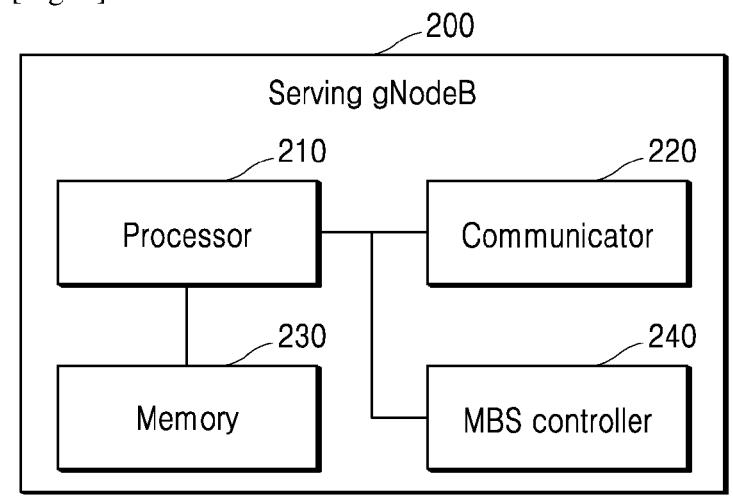
[Fig. 3]

[Fig. 4]
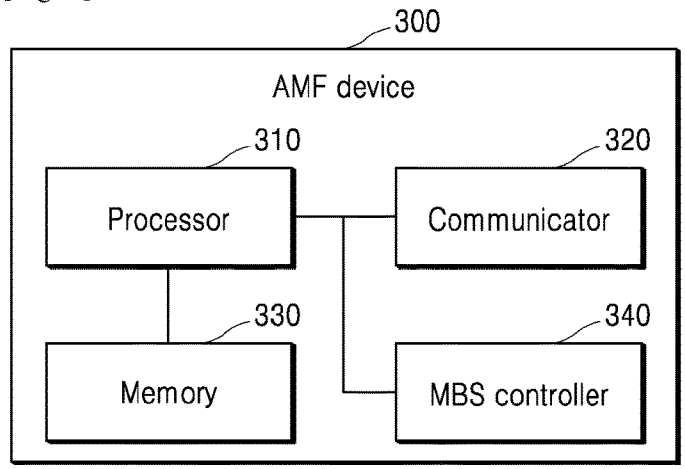
[Fig. 5a]
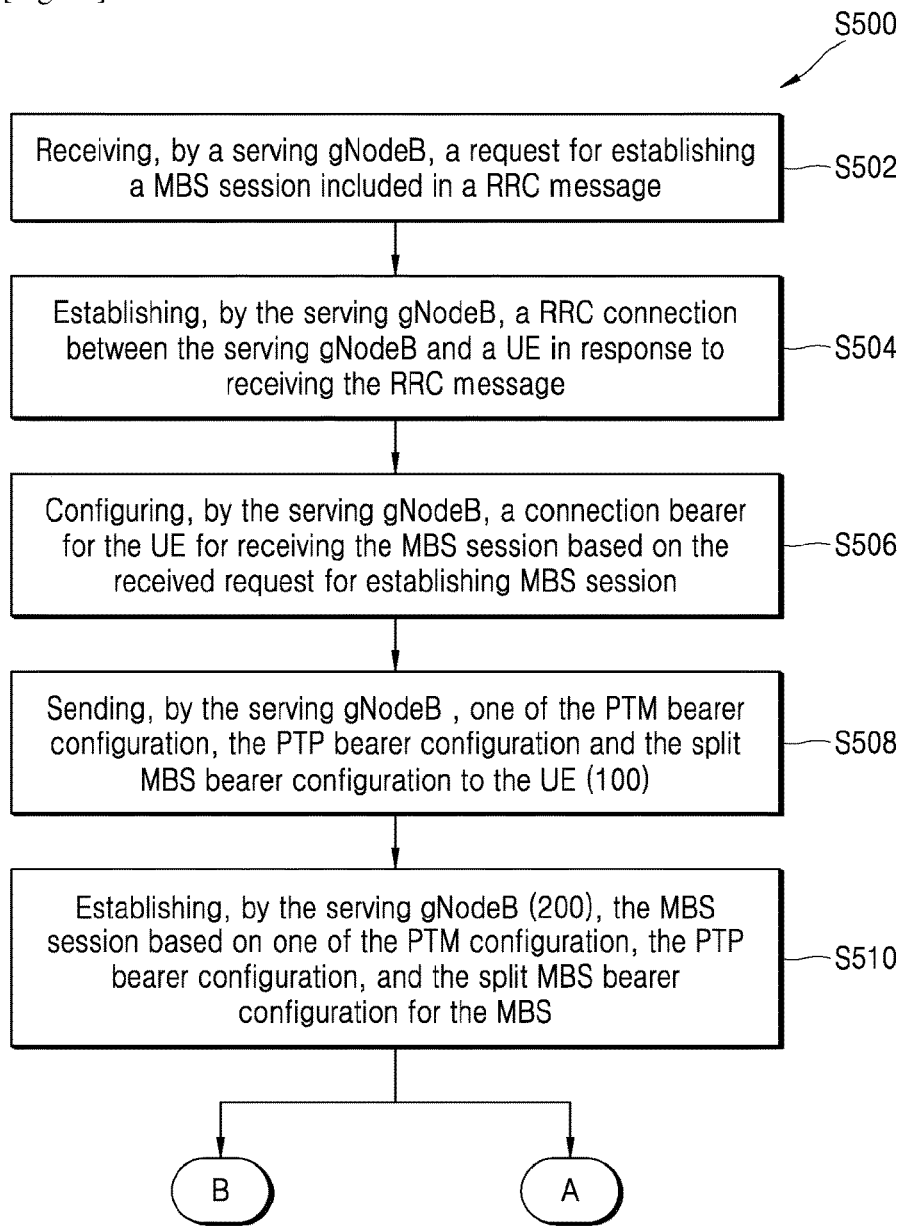

[Fig. 5b]
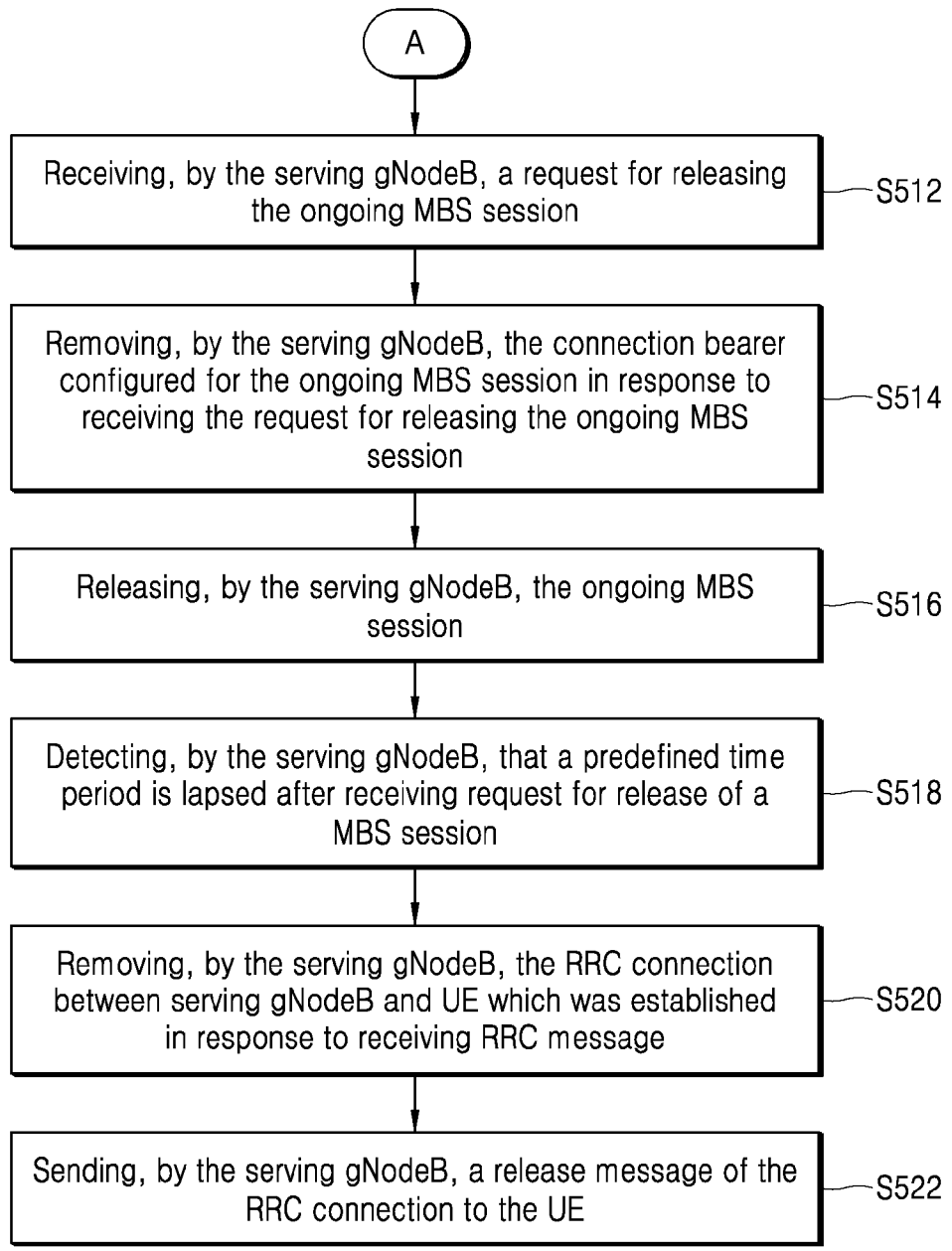

[Fig. 5c]
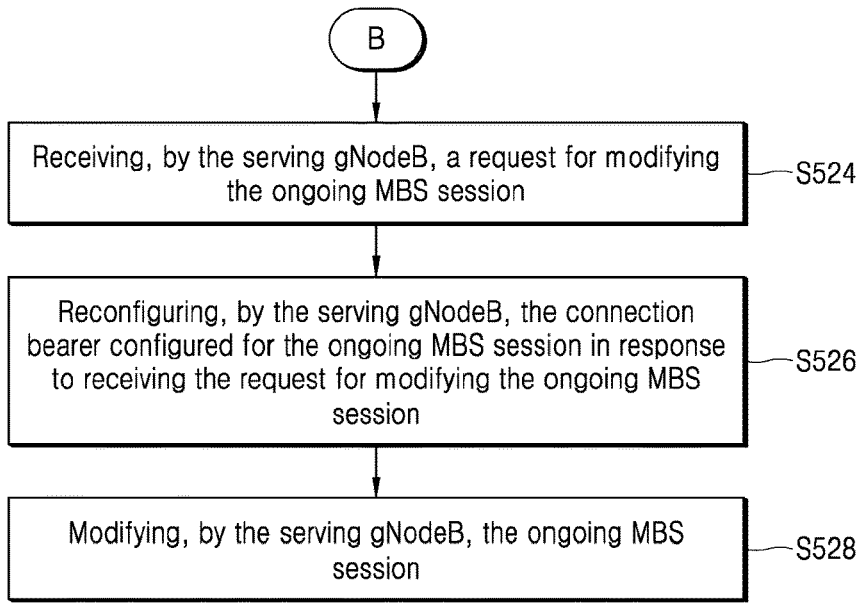
[Fig. 6a]
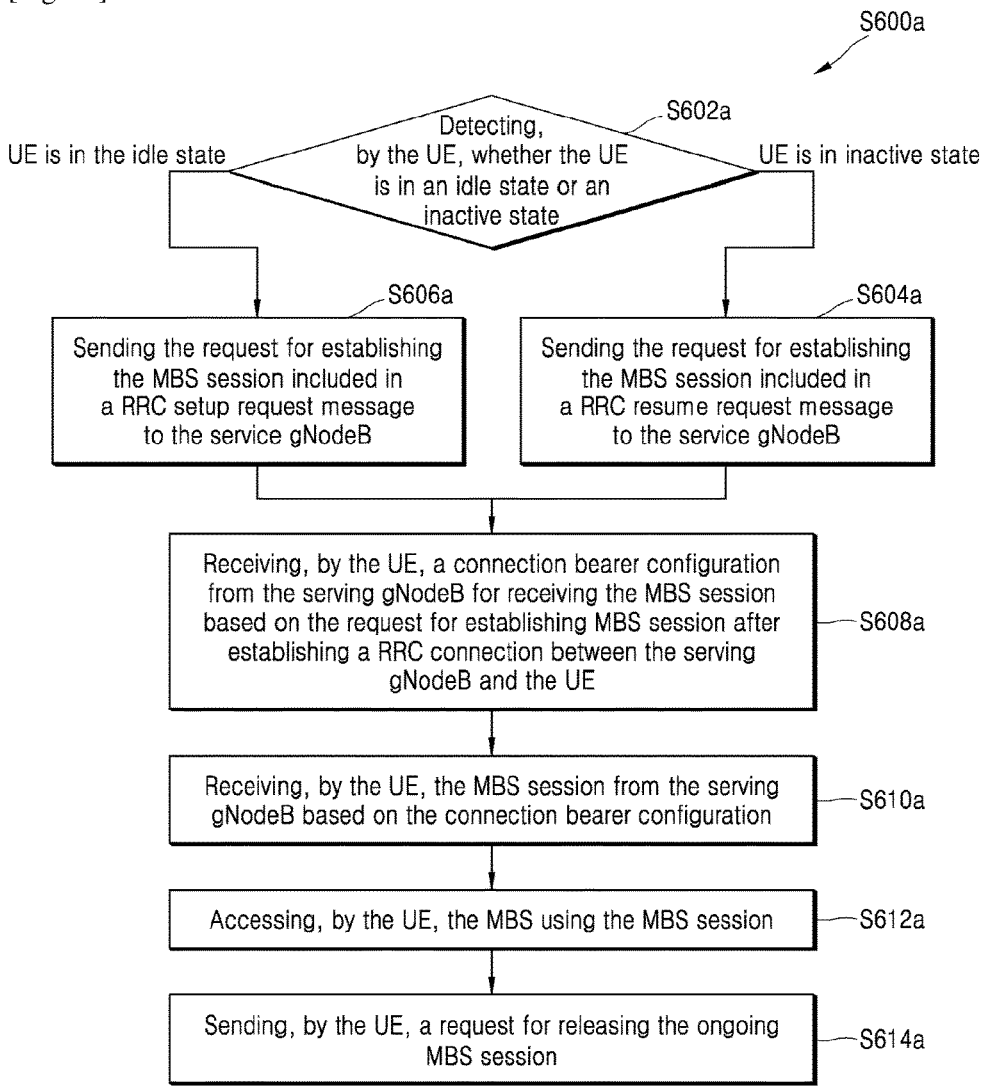

[Fig. 6b]
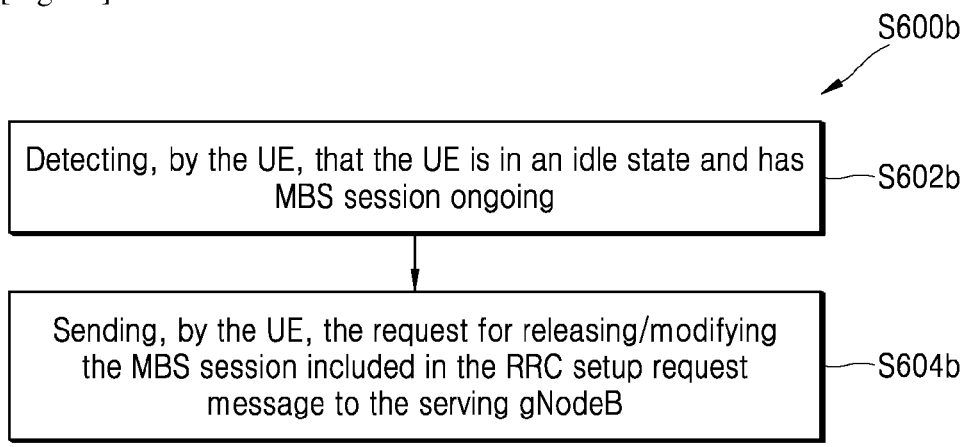
[Fig. 6c]
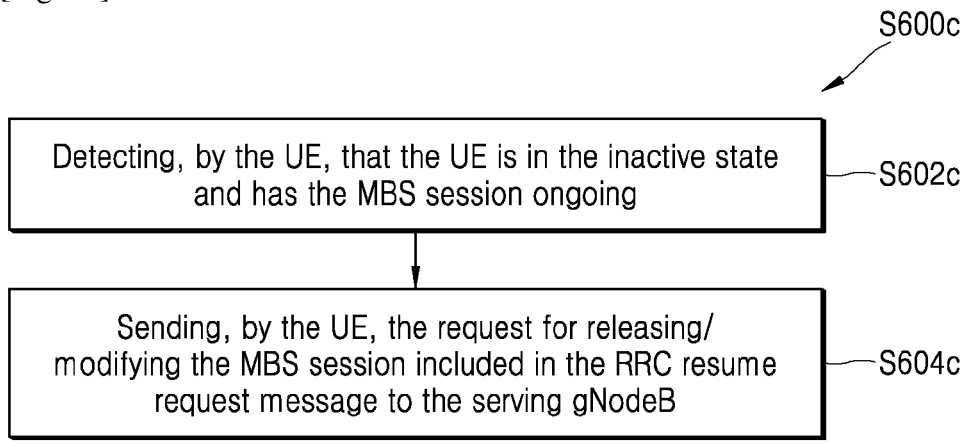

[Fig. 7]
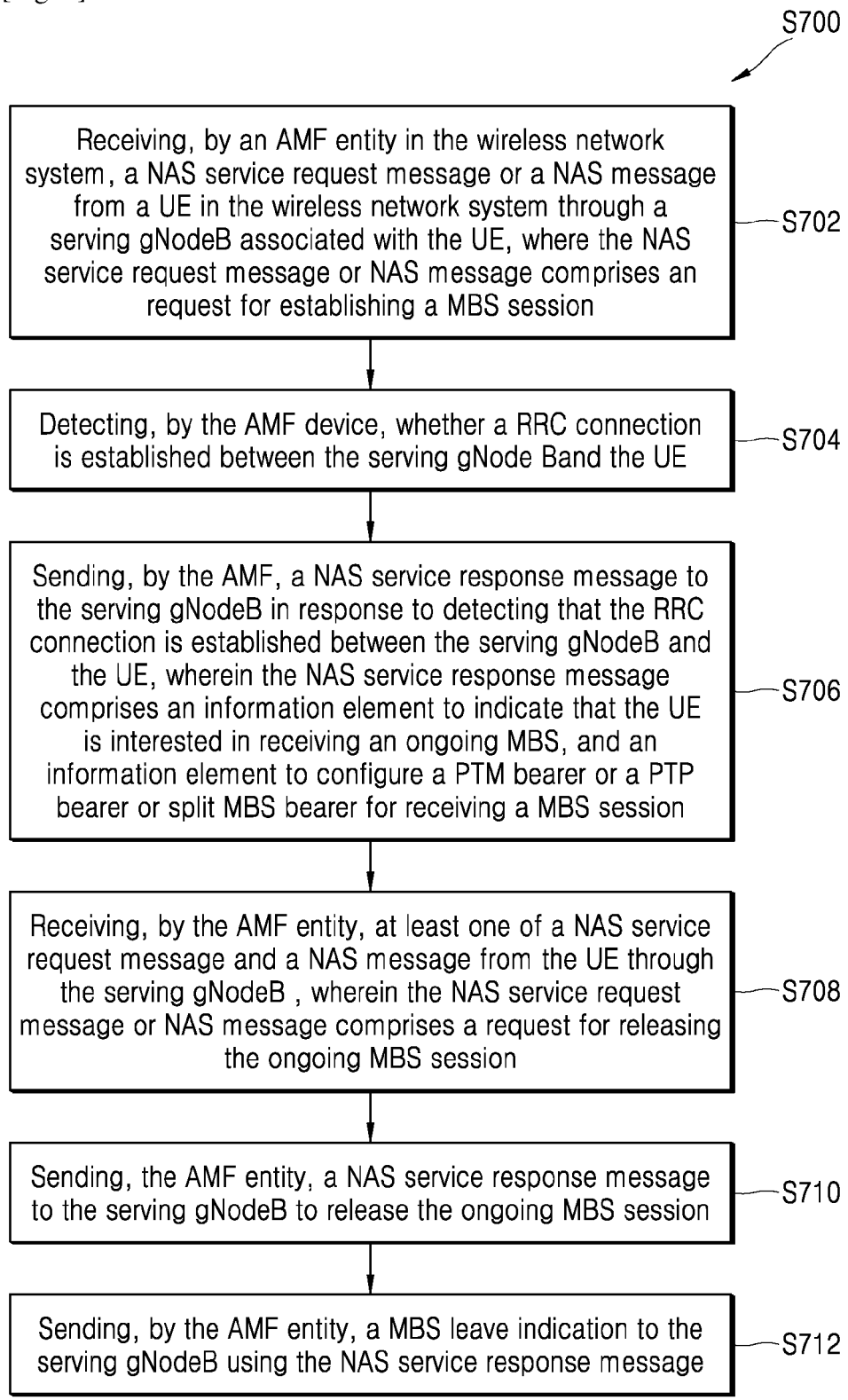

[Fig. 8]
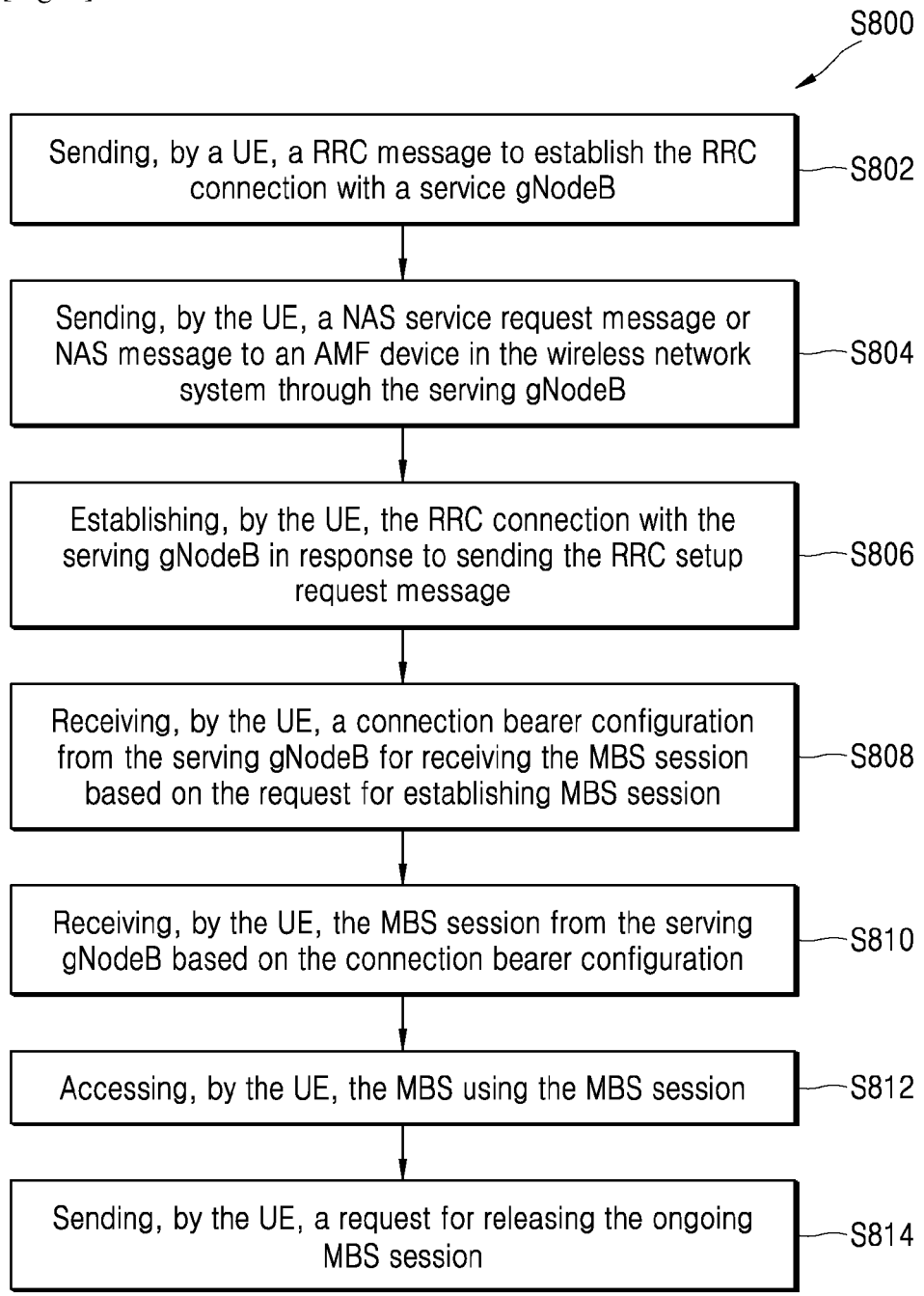

[Fig. 9]
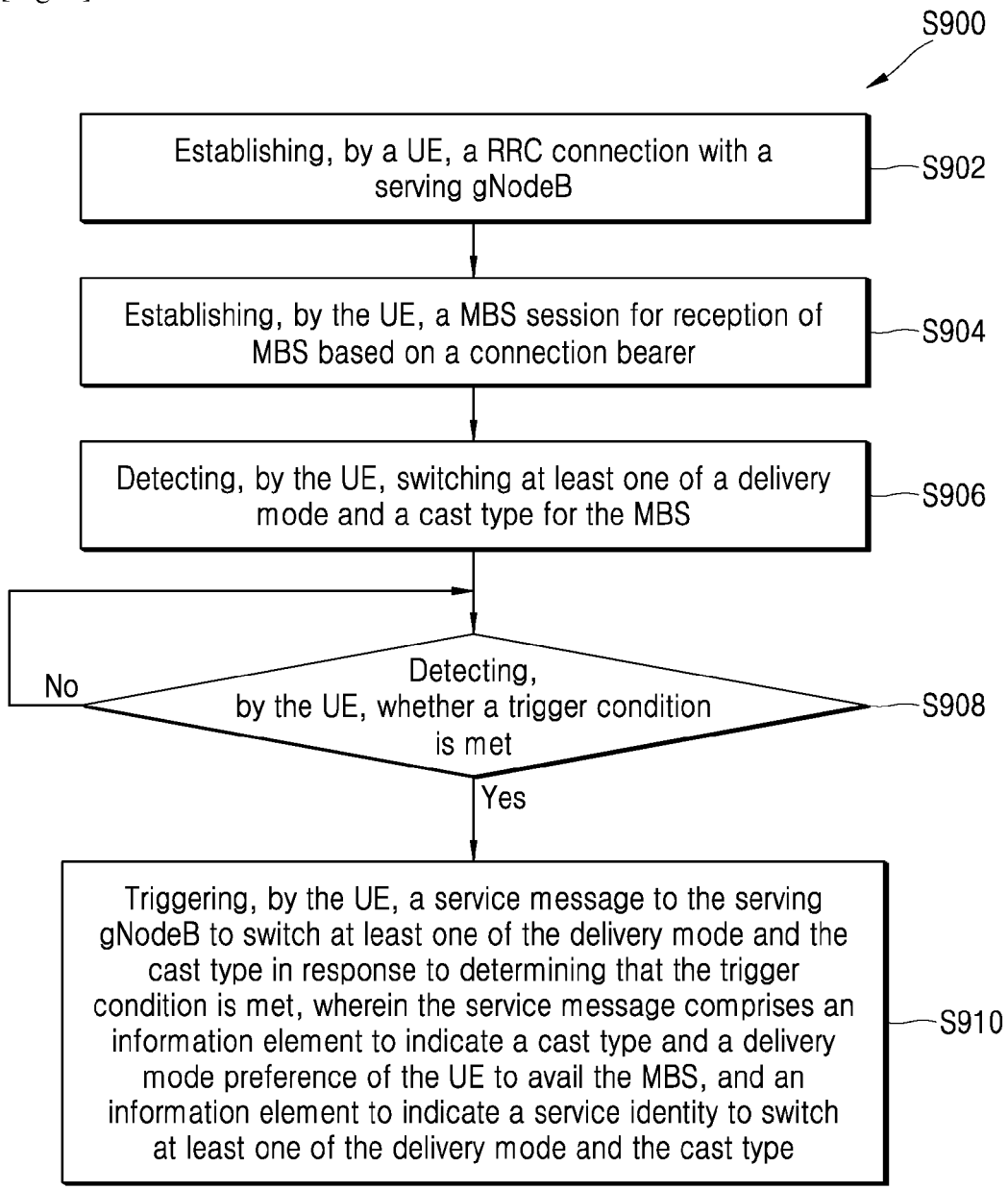

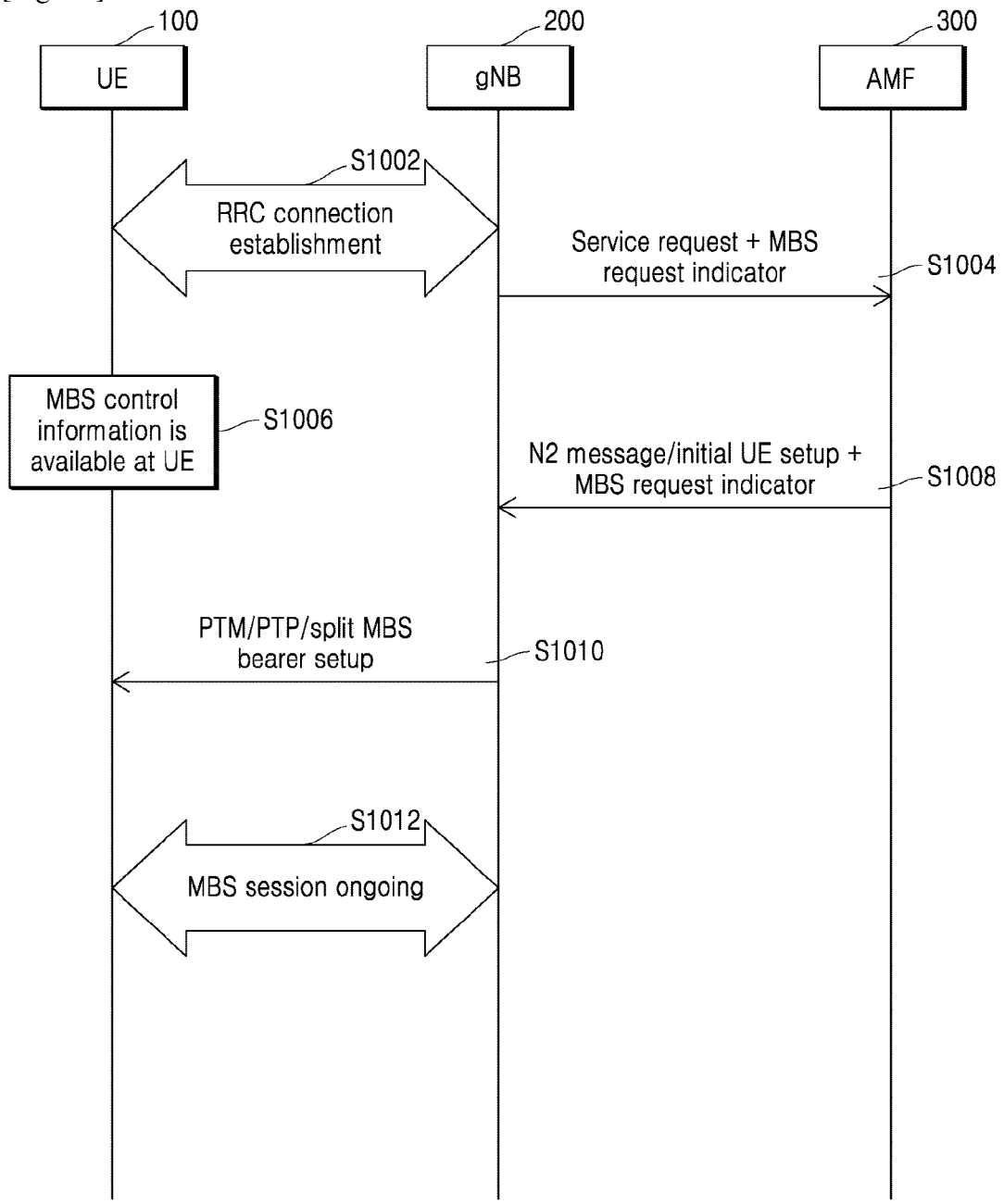

[Fig. 11]
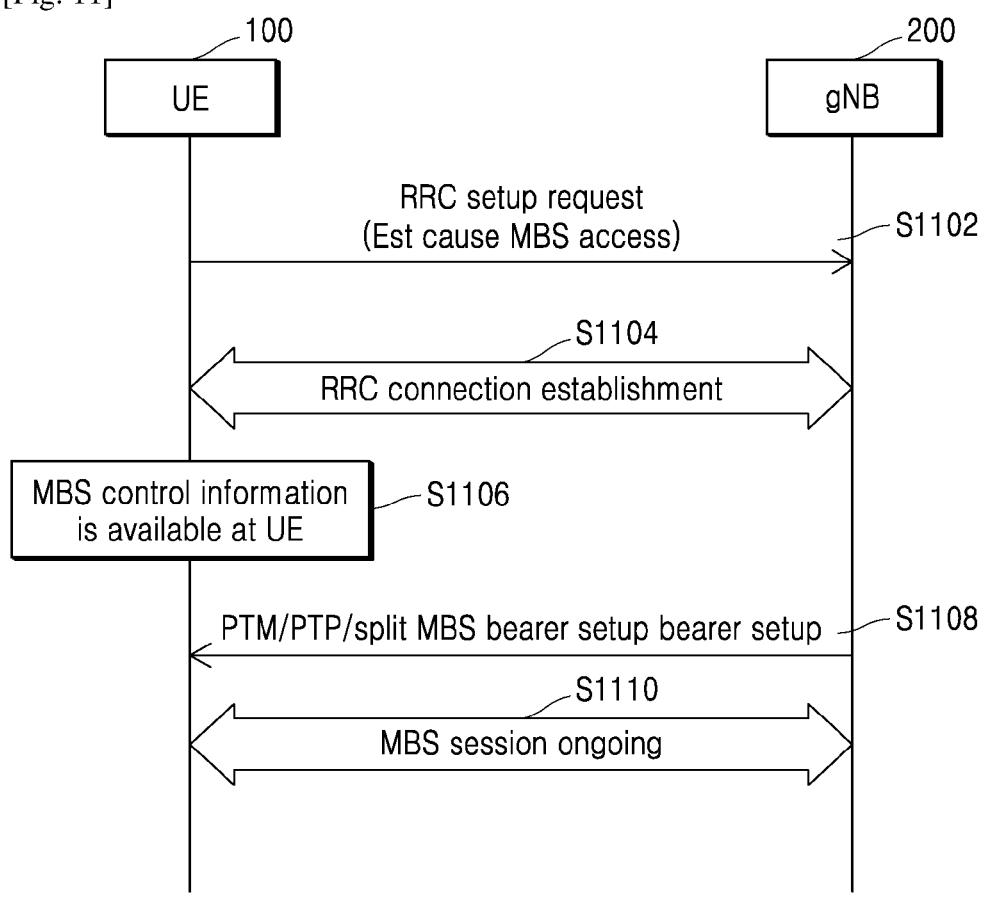

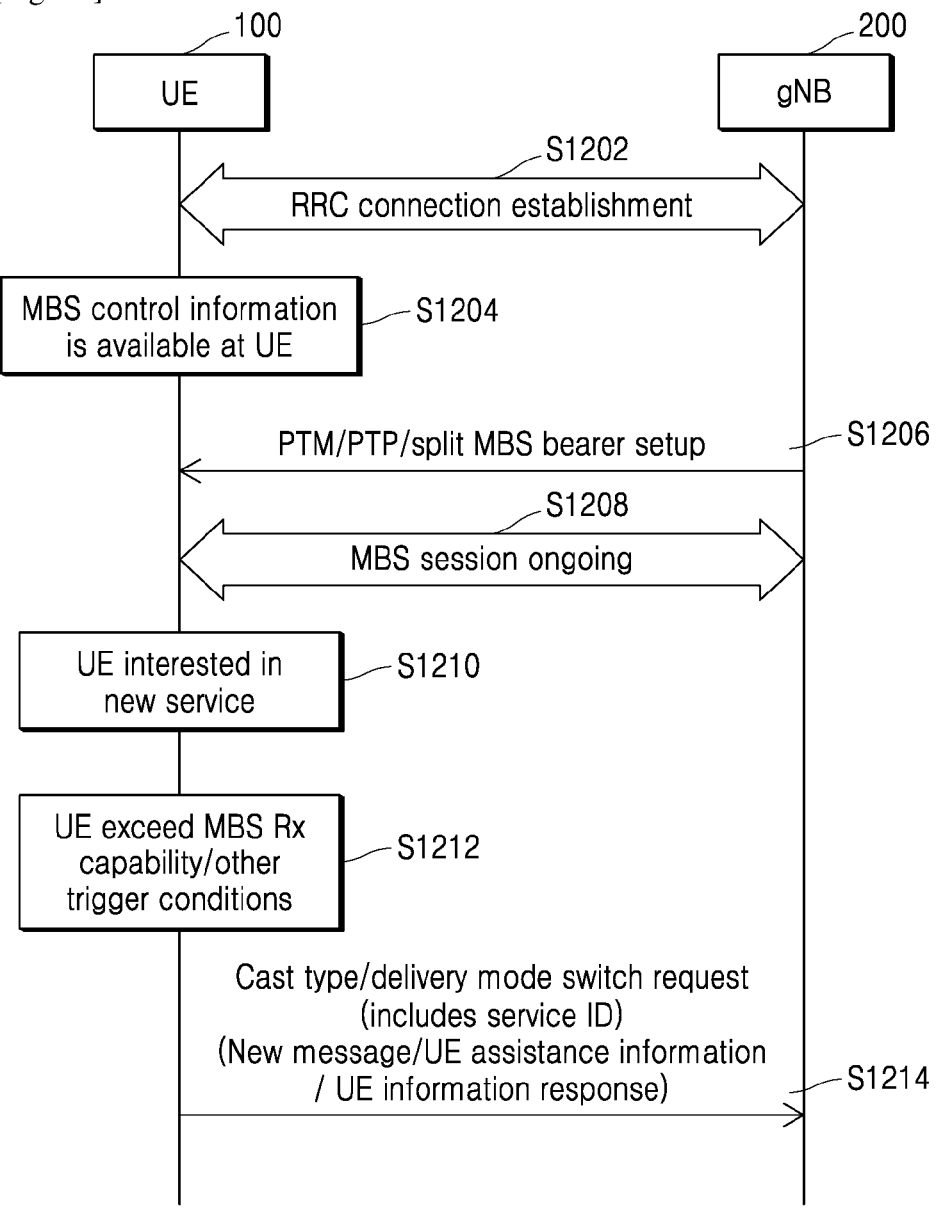
[Fig. 12]

[Fig. 13]
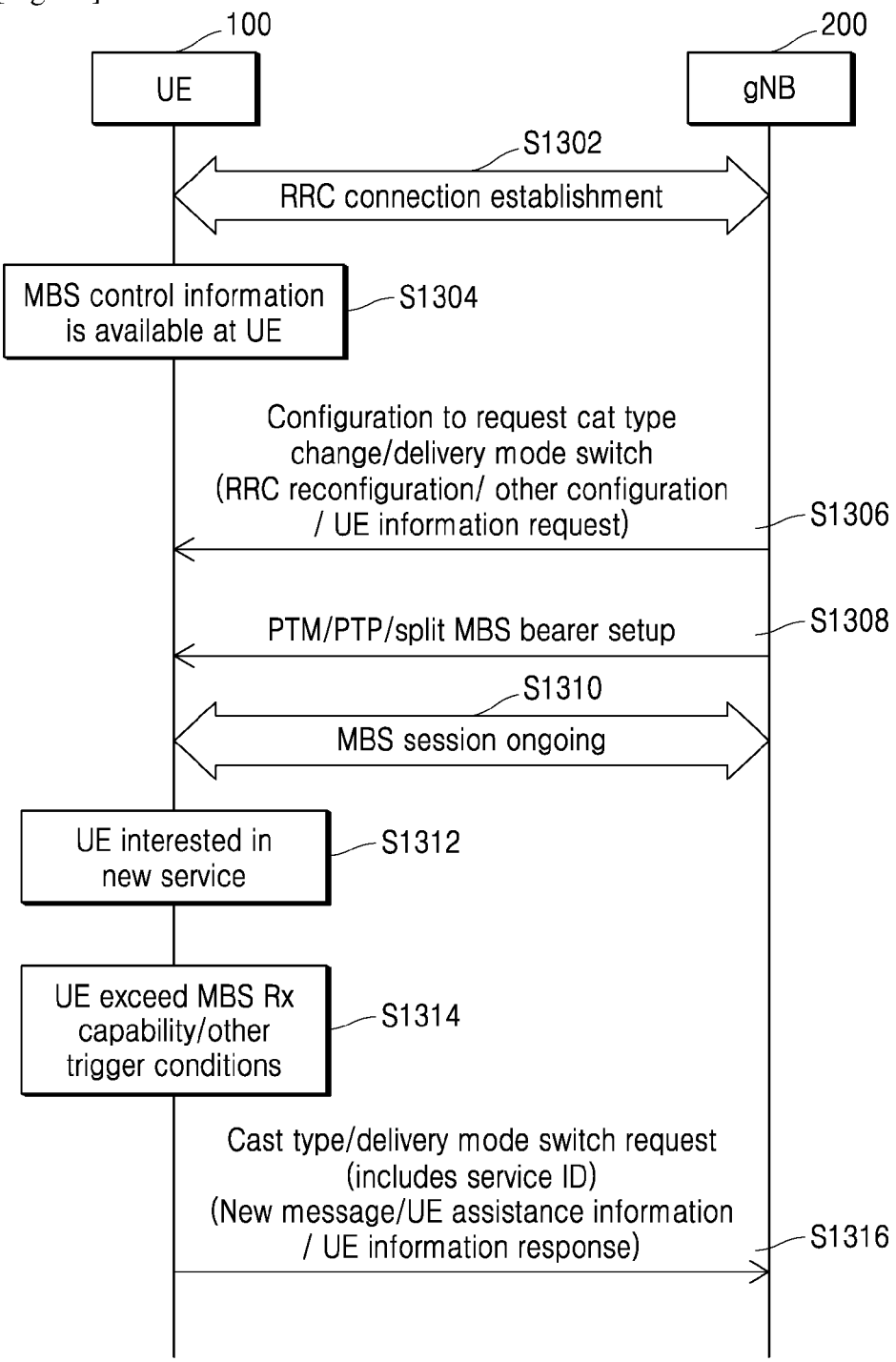

[Fig. 14]
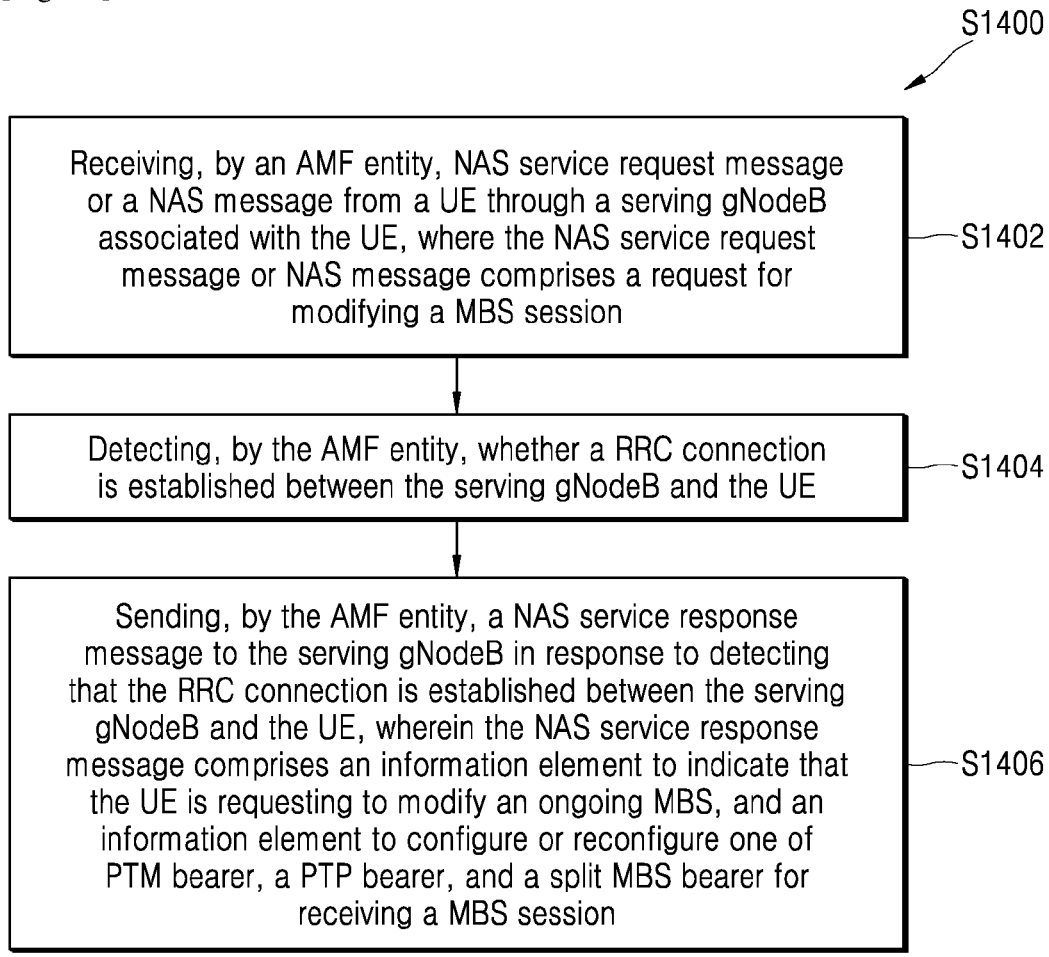
[Fig. 15]
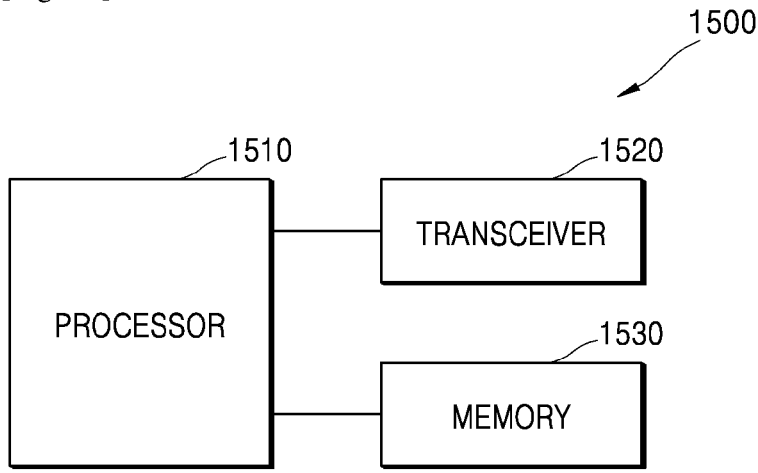

[Fig. 16]
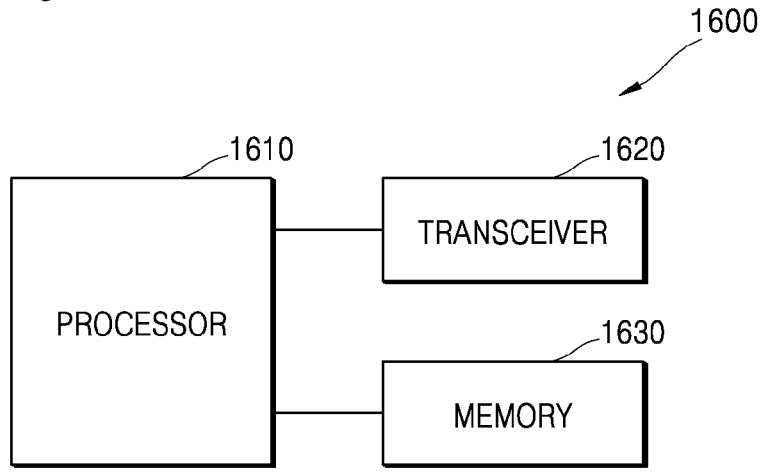
[Fig. 17]
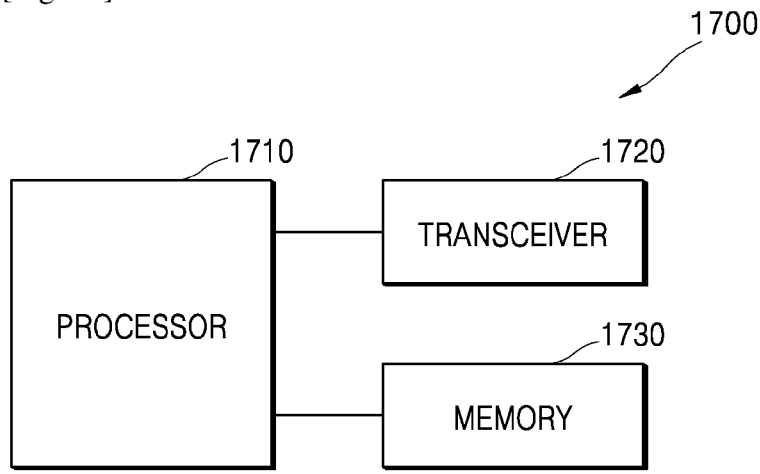
[Fig. 18]
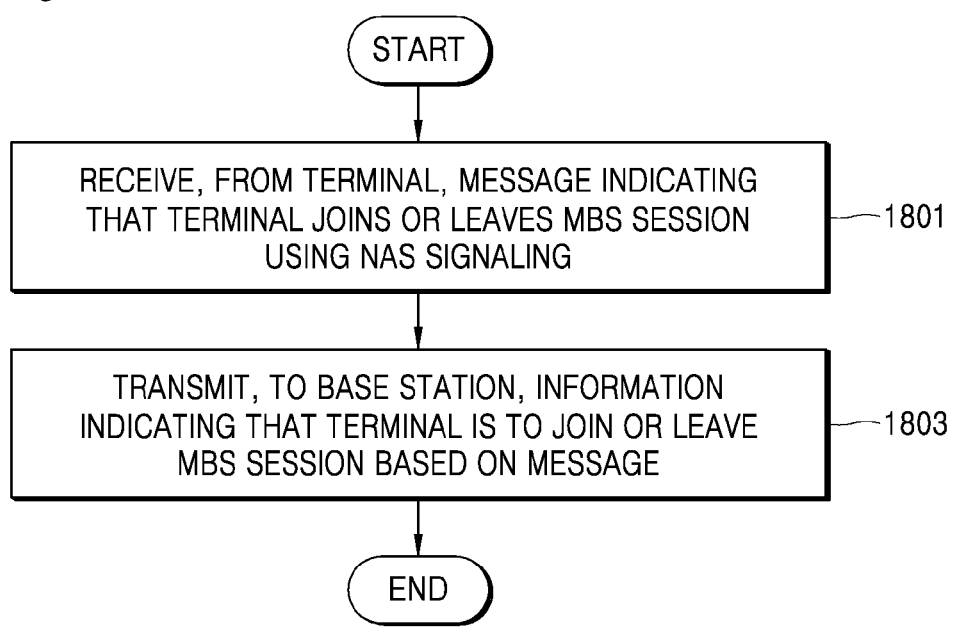

[Fig. 19]
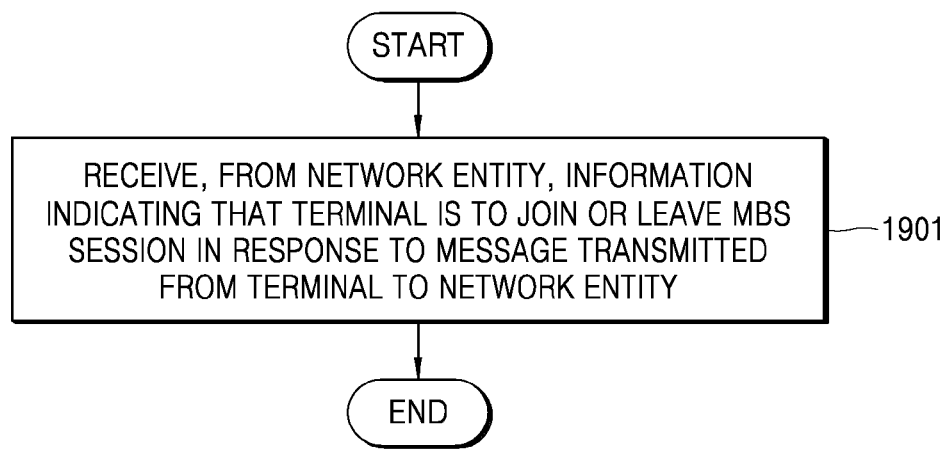

METHOD AND APPARATUS FOR HANDLING MULTICAST BROADCAST SERVICE IN WIRELESS COMMUNICATION SYSTEM

TECHNICAL FIELD

The disclosure relates to a wireless network system, and more specifically, the disclosure is related to a method and an apparatus for handling Multicast Broadcast Service (MBS) in the wireless network system.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

The disclosure provides a method and apparatus for handling the MBS service in a wireless communication system.

BRIEF DESCRIPTION OF DRAWINGS

The embodiments are illustrated in the accompanying drawings, throughout which like reference letters indicate corresponding parts in the various figures. The embodiments herein will be better understood from the following description with reference to the drawings, in which:

FIG. 1 is an overview of a wireless network system for handling a MBS session, according to the embodiments as disclosed herein;

FIG. 2 shows various hardware components of a UE for handling the MBS session in the wireless network system, according to the embodiments as disclosed herein;

FIG. 3 shows various hardware components of a serving gNodeB for handling the MBS session in the wireless network system, according to the embodiments as disclosed herein;

FIG. 4 shows various hardware components of an AMF entity for handling the MBS session in the wireless network system, according to the embodiments as disclosed herein;

FIG. 5a-FIG. 5c are example flow charts illustrating a method, implemented by the serving gNodeB, for handling the MBS session in the wireless network system, according to the embodiments as disclosed herein;

FIG. 6a-FIG. 6c are example flow charts illustrating a method, implemented by the UE, for handling the MBS session in the wireless network system, according to the embodiments as disclosed herein;

FIG. 7 is an example flow chart illustrating a method, implemented by the AMF entity, for handling the MBS session in the wireless network system, according to the embodiments as disclosed herein;

FIG. 8 is another example flow chart illustrating a method, implemented by the UE, for handling the MBS session in the wireless network system, according to the embodiments as disclosed herein;

FIG. 9 is an example flow chart illustrating a method, implemented by the UE, for handling the MBS session in the wireless network system by switching from a PTM bearer or a PTP bearer or split MBS bearer, according to the embodiments as disclosed herein;

FIG. 10 is an example signaling diagram illustrating a scenario of NAS based indication of connection establishment cause, according to the embodiments as disclosed herein;

FIG. 11 is an example signaling diagram illustrating a scenario of new RRC establishment cause, according to the embodiments as disclosed herein;

FIG. 12 is an example signaling diagram illustrating a scenario of UE autonomous assistance to switch from the PTM to the PTP and vice versa, according to the embodiments as disclosed herein;

FIG. 13 is another example signaling diagram illustrating a UE assistance to switch from the PTM to the PTP and vice versa based on a trigger and configuration from the wireless network system, according to the embodiments as disclosed herein;

FIG. 14 is an example flow chart illustrating a method, implemented by the AMF entity, for handling the MBS session in the wireless network system based on a NAS service request message or NAS message including a request for modifying the MBS session, according to the embodiments as disclosed herein;

FIG. 15 is a diagram illustrating a UE according to an embodiment of the disclosure;

FIG. 16 is a diagram illustrating a base station according to an embodiment of the disclosure;

FIG. 17 is a diagram illustrating a core entity according to an embodiment of the disclosure;

FIG. 18 is a flow chart illustrating a method performed by a network entity according to an embodiment of the disclosure; and FIG. 19 is a flow chart illustrating a method performed by a base station according to an embodiment of the disclosure.

MODE FOR THE INVENTION

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

In general, in a new radio mobile broadband system (NR MBS), there are three possible ways to signal common control information that is required to access or receive a MBS service. The signaling may be based on broadcast only, a combination of broadcast and unicast, and unicast only. For cases where at least some information on a MBS control signaling is sent using unicast signaling, a User Equipment (UE) needs to enter Radio Resource Control (RRC) CONNECTED state in order to receive unicast MBS control information. Further, based on the adopted service provisioning, the UE in a RRC IDLE or a RRC INACTIVE may not be allowed to start receiving MBS service directly i.e. the UE needs to enter the RRC connected state in order to receive the MBS service.

Thus, it is desired to address the above mentioned disadvantages or other shortcomings or at least provide a useful alternative.

The principal object of the embodiments herein is to provide a method and a system to handle a MBS service in a wireless network system.

Another object of the embodiments herein is to establish a MBS session for a UE.

Another object of the embodiments herein is to release an ongoing MBS session.

Another object of the embodiments herein is to modify an ongoing MBS session.

Another object of the embodiments herein is to switch from Point to Multipoint (PTM) bearer or a Point to Point (PTP) and vice versa for the MBS in a wireless network system.

Accordingly, the embodiment herein is to disclose a method for handling a MBS in a wireless network system. The method includes receiving, by a serving gNodeB, a request for establishing a MBS session included in a radio resource control (RRC) message. Further, the method includes establishing, by the serving gNodeB, a RRC connection between the serving gNodeB and a UE in response to receiving the RRC message. Further, the method includes configuring, by the serving gNodeB, a connection bearer for the UE for receiving the MBS session based on the received request for establishing MBS session. Further, the method includes establishing, by the serving gNodeB, the MBS session for the UE on the configured connection bearer.

In an embodiment, the request for establishing the MBS session includes a request for establishing an MBS access type comprising one of a point to multipoint (PTM), a point to point (PTP), and a split MBS bearer, a first MBS access cause comprising one of a normal priority MBS access and a high priority MBS access, and a second MBS access cause indicating to establish the MBS session.

In an embodiment, configuring by the serving gNodeB, the connection bearer for the UE includes configuring, by the serving gNodeB, one of the PTM bearer, the PTP bearer and the split MBS bearer for receiving the MBS session based on the received MBS access type.

In an embodiment, establishing, by the serving gNodeB, the MBS session for the UE on the configured connection bearer includes sending, by the serving gNodeB, one of the PTM bearer configuration, the PTP bearer configuration and the split MBS bearer configuration to the UE; and establishing, by the serving gNodeB, the MBS session based on one of the PTM configuration, the PTP bearer configuration, and the split MBS bearer configuration for the MBS.

In an embodiment, the RRC message is one of a RRC setup request message and a RRC resume request message.

In an embodiment, the RRC connection between the serving gNodeB and the UE based on at least one of a congestion at the gNodeB, a load at the gNodeB, and a permission by the gNodeB to allow the RRC connection.

In an embodiment, further the method includes receiving, by the serving gNodeB, a request for releasing the ongoing MBS session. Further, the method includes removing, by the serving gNodeB, the connection bearer configured for the ongoing MBS session in response to receiving the request for releasing the ongoing MBS session. Further, the method includes releasing, by the serving gNodeB, the ongoing MBS session.

In an embodiment, the request for releasing the ongoing MBS session includes a request for releasing an MBS access type associated with the ongoing MBS session, a first MBS access cause comprising one of a normal priority MBS access and a high priority MBS access associated with the ongoing MBS session, and a second MBS access cause indicating to release the ongoing MBS session.

In an embodiment, the method includes detecting, by the serving gNodeB, a predefined time period is lapsed after receiving request for release of a MBS session and removing, by the serving gNodeB, the RRC connection between serving gNodeB and UE which was established in response to receiving RRC message. Further, the method includes sending, by the serving gNodeB, a release message of the RRC connection to the UE.

In an embodiment, the method includes receiving, by the serving gNodeB, a request for modifying the ongoing MBS session. Further, the method includes reconfiguring, by the serving gNodeB, the connection bearer configured for the ongoing MBS session in response to receiving the request for modifying the ongoing MBS session. Further, the method includes modifying, by the serving gNodeB, the ongoing MBS session.

In an embodiment, the request for modifying the ongoing MBS session includes a request for modifying an MBS access type associated with the ongoing MBS session, a first MBS access cause comprising one of a normal priority MBS access and a high priority MBS access associated with the ongoing MBS session, and a second MBS access cause indicating to modify the ongoing MBS session.

Accordingly, the embodiment herein is to disclose a method for handling a MBS in a wireless network system. The method includes sending, by a UE, a request for establishing a MBS session included in a radio resource control (RRC) message to a service gNodeB. Further, the method includes receiving, by the UE, a connection bearer configuration from the serving gNodeB for receiving the MBS session based on the request for establishing MBS session after establishing a RRC connection between the serving gNodeB and the UE. Further, the method includes receiving, by the UE, the MBS session from the serving gNodeB based on the connection bearer configuration. Further, the method includes accessing, by the UE, the MBS using the MBS session.

In an embodiment, wherein the request for establishing the MBS session includes: e a first MBS access cause comprising one of a normal priority MBS access and a high priority MBS access, and a second MBS access cause indicating to establish the MBS session.

In an embodiment, wherein the connection bearer configuration is one of a PTM bearer configuration, a PTP bearer configuration or a split MBS bearer configuration.

In an embodiment, sending, by the UE, the request for establishing the MBS session included in the RRC message to the service gNodeB includes detecting, by the UE, whether the UE is in an idle state or inactive state, and performing, by the UE, one of: sending the request for establishing the MBS session included in a RRC setup request message to the serving gNodeB in response to detecting that the UE is in the idle state, and sending the request for establishing the MBS session included in a RRC resume request message to the service gNodeB in response to detecting that the UE is in the inactive state.

In an embodiment, the method includes sending, by the UE, a request for releasing the ongoing MBS session. The request for releasing the ongoing MBS session includes a request for releasing an MBS access type associated with the ongoing MBS session, a first MBS access cause comprising one of a normal priority MBS access and a high priority MBS access associated with the ongoing MBS session, and a second MBS access cause indicating to release the ongoing MBS session.

Accordingly, the embodiment herein is to disclose a method for handling a MBS in a wireless network system. The method includes receiving, by an AMF entity, at least one of a NAS service request message and a NAS message from a UE through a serving gNodeB associated with the UE. The NAS service request message or NAS message comprises a request for establishing a MBS session. Further, the method includes detecting, by the AMF device, whether a RRC connection is established between the serving gNodeB and the UE. Further, the method includes sending, by the AMF, a NAS service response message to the serving gNodeB in response to detecting that the RRC connection is established between the serving gNodeB and the UE. The NAS service response message includes an information element to indicate that the UE is interested in receiving an ongoing MBS, and an information element to configure one of a PTM bearer, a PTP bearer, and a split MBS bearer for receiving a MBS session.

In an embodiment, the AMF sends a MBS join indication to the serving gNodeB using the NAS service response message.

In an embodiment, the method includes receiving, by the AMF, at least one of a NAS service request message and a NAS message from the UE through the serving gNodeB. The NAS service request message or NAS message comprises a request for releasing the ongoing MBS session. Further, the method includes sending, the AMF, a NAS service response message to the serving gNodeB to release the ongoing MBS session.

In an embodiment, the AMF sends a MBS leave indication to the serving gNodeB using the NAS service response message.

In an embodiment, the method further includes detecting, by the serving gNodeB, a predefined time period is lapsed after receiving request for release of a MBS session. Further, the method includes removing, by the serving gNodeB, the RRC connection between serving gNodeB and the UE which was established in response to receiving RRC message. Further, the method includes sending, by the serving gNodeB, a release message of the RRC connection to the UE.

Accordingly, the embodiment herein is to disclose a method for handling a MBS in a wireless network system. The method includes sending, by the UE, a RRC message to establish the RRC connection with a service gNodeB. Further, the method includes sending, by the UE, at least one of a NAS service request message and a NAS message to an AMF entity through the serving gNodeB. The NAS service request message or NAS message comprises a request for establishing a MBS session. Further, the method includes establishing, by the UE, the RRC connection with the serving gNodeB in response to sending the RRC message. Further, the method includes receiving, by the UE, a connection bearer configuration from the serving gNodeB for receiving the MBS session based on the request for establishing MBS session. Further, the method includes receiving, by the UE, the MBS session from the serving gNodeB based on the connection bearer configuration. Further, the method includes accessing, by the UE, the MBS using the MBS session.

In an embodiment, wherein the request for establishing the MBS session includes: a request for establishing an MBS access type comprising one of a point to multi-point (PTM), a point to point (PTP), and a split MBS bearer, a first MBS access cause comprising one of a normal priority MBS access and a high priority MBS access, and a second MBS access cause indicating to establish the MBS session.

In an embodiment, wherein the connection bearer configuration is one of a PTM bearer configuration, a PTP bearer configuration, or a split MBS bearer configuration.

In an embodiment, the method comprises sending, by the UE, a request for releasing the ongoing MBS session, where the request for releasing the ongoing MBS session includes a request for releasing an MBS access type associated with the ongoing MBS session, a first MBS access cause comprising one of a normal priority MBS access and a high priority MBS access associated with the ongoing MBS session, and a second MBS access cause indicating to release the ongoing MBS session.

Accordingly, the embodiment herein is to disclose a serving gNodeB for handling a MBS in a wireless network system. The serving gNodeB includes a MBS controller communicatively coupled to a memory and a processor. The MBS controller is configured to receive a request for establishing a MBS session included in a RRC message. Further, the MBS controller is configured to establish a RRC connection between the serving gNodeB and a UE in response to receiving the RRC message. Further, the MBS controller is configured to configure a connection bearer for the UE for receiving the MBS session based on the received request for establishing MBS session and establish the MBS session for the UE on the configured connection bearer.

In an embodiment, configuring by the serving gNodeB, the connection bearer for the UE includes configuring one of the PTM bearer, the PTP bearer and the split MBS bearer for receiving the MBS session based on the received MBS access type.

In an embodiment, establishing, by the serving gNodeB, the MBS session for the UE on the configured connection bearer includes sending one of the PTM bearer configuration, the PTP bearer configuration and the split MBS bearer configuration to the UE, and establishing the MBS session based on one of the PTM configuration, the PTP bearer configuration, and the split MBS bearer configuration for the MBS.

In an embodiment, the RRC connection between the serving gNodeB and the UE based on at least one of a congestion at the gNodeB, a load at the gNodeB, and a permission by the gNodeB to allow the RRC connection.

In an embodiment, the MBS controller is configured to receive a request for releasing the ongoing MBS session. Further, the MBS controller removes the connection bearer configured for the ongoing MBS session in response to receiving the request for releasing the ongoing MBS session and releases the ongoing MBS session.

In an embodiment, wherein the request for releasing the ongoing MBS session includes: a request for releasing an MBS access type associated with the ongoing MBS session, a first MBS access cause comprising one of a normal priority MBS access and a high priority MBS access associated with the ongoing MBS session, and a second MBS access cause indicating to release the ongoing MBS session.

In an embodiment, the MBS controller is configured to detect a predefined time period is lapsed after receiving request for release of a MBS session. Further, the MBS controller removes the RRC connection between serving gNodeB and the UE which was established in response to receiving RRC message. Further, the MBS controller sends a release message of the RRC connection to the UE.

In an embodiment, the MBS controller is configured to receive a request for modifying the ongoing MBS session. Further, the MBS controller is configured to reconfigure the connection bearer configured for the ongoing MBS session in response to receiving the request for modifying the ongoing MBS session. Further, the MBS controller is configured to modify the ongoing MBS session.

In an embodiment, wherein the request for modifying the ongoing MBS session includes: a request for modifying an MBS access type associated with the ongoing MBS session, a first MBS access cause comprising one of a normal priority MBS access and a high priority MBS access associated with the ongoing MBS session, and a second MBS access cause indicating to modify the ongoing MBS session.

Accordingly, the embodiment herein is to disclose a UE for handling a MBS in a wireless network system. The UE includes a MBS controller communicatively coupled to a memory and a processor. The MBS controller is configured to send a request for establishing a MBS session included in a RRC message to a service gNodeB. Further, the MBS controller is configured to receive a connection bearer configuration from the serving gNodeB for receiving the MBS session based on the request for establishing MBS session after establishing a RRC connection between the serving gNodeB and the UE. Further, the MBS controller is configured to receive the MBS session from the serving gNodeB based on the connection bearer configuration. Further, the MBS controller is configured to access the MBS using the MBS session.

In an embodiment, send the request for establishing the MBS session included in the RRC message to the service gNodeB includes detect whether the UE is in an idle state or inactive state, and perform one of send the request for establishing the MBS session included in a RRC setup request message to the serving gNodeB in response to detecting that the UE is in the idle state, and send the request for establishing the MBS session included in a RRC resume request message to the service gNodeB in response to detecting that the UE is in the inactive state.

In an embodiment, wherein the MBS controller (140) is configured to send a request for releasing the ongoing MBS session, wherein the request for releasing the ongoing MBS session includes: a request for releasing an MBS access type associated with the ongoing MBS session, a first MBS access cause comprising one of a normal priority MBS access and a high priority MBS access associated with the ongoing MBS session, and a second MBS access cause indicating to release the ongoing MBS session.

Accordingly, the embodiment herein is to disclose an AMF entity for handling a MBS in a wireless network system. The AMF includes a MBS controller communicatively coupled to a memory and a processor. The MBS controller is configured to receive at least one of a NAS service request message and a NAS message from a UE through a serving gNodeB associated with the UE. The NAS service request message or NAS message comprises a request for establishing a MBS session. The MBS controller is configured to detect whether a RRC connection is established between the serving gNodeB and the UE. Further, the MBS controller is configured to send a NAS service response message to the serving gNodeB in response to detecting that the RRC connection is established between the serving gNodeB and the UE. The NAS service response message comprises an information element to indicate that the UE is interested in receiving an ongoing MBS, and an information element to configure one of a Point to Multipoint (PTM) bearer, a Point to Point (PTP) bearer, and a split MBS bearer for receiving a MBS session.

In an embodiment, wherein the MBS controller (340) is configured to send a MBS join indication to the serving gNodeB (200) using the NAS service response message.

In an embodiment, wherein the MBS controller (340) is configured to: receive at least one of a NAS service request message and a NAS message from the UE (100) through the serving gNodeB (200), wherein the NAS service request message or NAS message comprises a request for releasing the ongoing MBS session; and send a NAS service response message to the serving gNodeB (200) to release the ongoing MBS session.

In an embodiment, wherein the MBS controller (340) is configured to send a MBS leave indication to the serving gNodeB (200) using the NAS service response message.

Accordingly, the embodiment herein is to disclose a UE for handling a MBS in a wireless network system. The UE includes a MBS controller communicatively coupled to a memory and a processor. The MBS controller is configured to send a RRC message to establish the RRC connection with a service gNodeB. Further, the MBS controller is configured to send a NAS service request message and a NAS message to an AMF entity through the serving gNodeB. The NAS service request message or NAS message comprises a request for establishing a MBS session. Further, the MBS controller is configured to establish the RRC connection with the serving gNodeB in response to sending the RRC message. Further, the MBS controller is configured to receive a connection bearer configuration from the serving gNodeB for receiving the MBS session based on the request for establishing MBS session. Further, the MBS controller is configured to receive the MBS session from the serving gNodeB based on the connection bearer configuration. Further, the MBS controller is configured to access the MBS using the MBS session.

Accordingly, the embodiment herein is to disclose a method for handling a MBS in a wireless network system. The method includes establishing, by a UE, a RRC connection with a serving gNodeB. Further, the method includes establishing, by the UE, a MBS session for reception of MBS based on a connection bearer. The connection bearer is at least one of a PTM bearer configuration, a PTP bearer configuration, and a split MBS bearer configuration received from the serving gNodeB after establishing the RRC connection. Further, the method includes detecting, by the UE, switching at least one of a delivery mode and a cast type for the MBS. Further, the method includes detecting, by the UE, whether a trigger condition is met. Further, the method includes triggering, by the UE, a service message to the serving gNodeB to switch at least one of the delivery mode and the cast type in response to determining that the trigger condition is met.

In an embodiment, the service message includes an information element to indicate a cast type and a delivery mode preference of the UE to avail the MBS, and an information element to indicate a service identity to switch at least one of the delivery mode and the cast type.

In an embodiment, further, the method includes configuring, by the serving gNodeB, a configuration at the UE to send the service message comprising an information element to indicate a cast type and a delivery mode preference of the UE to switch at least one of the delivery mode and the cast type, and an information element to indicate the service identity to switch at least one of the delivery mode and the cast type.

In an embodiment, the service message is one of UE assistance information message, a UE information response message, a new RRC message, a MAC CE, a MBS interest indication message.

In an embodiment, the method includes configuring, by the gNodeB, the trigger condition at the UE to send the service message comprising an information element to indicate a cast type and a delivery mode preference of the UE to switch at least one of the delivery mode and the cast type, and an information element to indicate a service identity to avail the MBS.

In an embodiment, the trigger condition includes at least one of a type of service, a signal strength measurement, a Signal to Interference Noise Ratio (SINR), a channel quality, a Block Error Rate (BLER), a location of the UE, a mobility of UE and UE preference and assistance information.

In an embodiment, the UE indicates the preference based on at least one of PTM/PTP switch, delivery mode change and network configured conditions.

Accordingly, the embodiment herein is to disclose a UE for handling a MBS in a wireless network system. The UE includes a MBS controller communicatively coupled to a memory and a processor. The MBS controller is configured to establish a RRC connection with a serving gNodeB. Further, the MBS controller is configured to establish a MBS session for reception of MBS based on a connection bearer. The connection bearer is at least one of a PTM bearer configuration, a PTP bearer configuration, and a split MBS bearer configuration received from the serving gNodeB after establishing the RRC connection. Further, the MBS controller is configured to detect switching at least one of a delivery mode and a cast type for the MBS. Further, the MBS controller is configured to detect whether a trigger condition is met. Further, the MBS controller is configured to trigger a service message to the serving gNodeB to switch at least one of the delivery mode and the cast type in response to determining that the trigger condition is met. The service message includes an information element to indicate a cast type and a delivery mode preference of the UE to avail the MBS, and an information element to indicate a service identity to avail the MBS.

Accordingly, the embodiment herein is to disclose a method for handling a MBS in a wireless network system. The method includes receiving, by an AMF entity, at least one of a NAS service request message and a NAS message from a UE through a serving gNodeB associated with the UE. The NAS service request message or NAS message comprises a request for modifying a MBS session. Further, the method includes detecting, by the AMF device, whether a RRC connection is established between the serving gNodeB and the UE. Further, the method includes sending, by the AMF, a NAS service response message to the serving gNodeB in response to detecting that the RRC connection is established between the serving gNodeB and the UE. The NAS service response message includes an information element to indicate that the UE is requesting to modify an ongoing MBS, and an information element to configure or reconfigure one of a PTM bearer, a PTP bearer, and a split MBS bearer for receiving a MBS session.

In an embodiment, the AMF sends a MBS modification indication to the serving gNodeB using the NAS service response message.

Accordingly, the embodiment herein is to disclose an AMF entity for handling a MBS in a wireless network system. The AMF includes a MBS controller communicatively coupled to the memory and the processor. The MBS controller is configured to receive at least one of a NAS service request message and a NAS message from a UE through a serving gNodeB associated with the UE. The NAS service request message or NAS message comprises a request for modifying a MBS session. Further, the MBS controller is configured to detect whether a RRC connection is established between the serving gNodeB and the UE. Further, the MBS controller is configured to send a NAS service response message to the serving gNodeB in response to detecting that the RRC connection is established between the serving gNodeB and the UE. The NAS service response message includes an information element to indicate that the UE is requesting to modify an ongoing MBS, and an information element to configure or reconfigure one of a PTM bearer, a PTP bearer, and a split MBS bearer for receiving a MBS session.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

In an embodiment, wherein the AMF entity (300) sends a MBS modification indication to the serving gNodeB (200) using the NAS service response message.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to disclose a method for handling a MBS in a wireless network system. The method includes receiving, by a serving gNodeB, a request for establishing a MBS session included in a RRC message. Further, the method includes establishing, by the serving gNodeB, a RRC connection between the serving gNodeB and a UE in response to receiving the RRC message. Further, the method includes configuring, by the serving gNodeB, a connection bearer for the UE for receiving the MBS session based on the received request for establishing MBS session. Further, the method includes establishing, by the serving gNodeB, the MBS session for the UE on the configured connection bearer.

For a MBS configuration is signaled in a NR, the MBS configuration may be required for the UE to enter a RRC CONNECTED state in order to start an MBS session. The UE requests for the RRC connection for a number of services which include Mobile Originated (MO) data, Mobile Terminated (MT) access, signaling, high priority access etc. If a specific reason for connection establishment is known, then a gNB node cannot perform radio admission control correctly and prioritize connections based on access priority and importance. Therefore, it is required that the serving gNB is made aware that the UE is requesting for the MBS services. The proposed method can be used for establishing the MBS session in the wireless network system in an effective manner as the serving gNB is made aware that the UE is requesting for the MBS services. Hence, the serving gNB can perform radio admission control correctly and prioritize connections based on access priority and importance.

Referring now to the drawings and more particularly to FIGS. 1 through 19, where similar reference characters denote corresponding features consistently throughout the figures, there are shown preferred embodiments.

FIG. 1 is an overview of a wireless network system (1000) for handling a MBS service, according to the embodiments as disclosed herein. In an embodiment, the wireless network system (1000) includes a UE (100), a serving gNodeB (200) and an AMF entity (300). The UE (100), the serving gNodeB (200) and the AMF entity (300) are communicated each other through wired communication means and wireless communication means. The UE (100), can be, for example, but not limited to a smart phone, a smart watch, a foldable device, a IoT device or the like.

In an embodiment, the serving gNodeB (200) is configured to receive a request for establishing a MBS session included in a RRC message. The request for establishing the MBS session includes a request for establishing an MBS access type including one of a PTM, a PTP, and a split MBS bearer, a first MBS access cause including one of a normal priority MBS access and a high priority MBS access, and a second MBS access cause indicating to establish the MBS session. The RRC message is one of a RRC setup request message and a RRC resume request message.

In response to receiving the RRC message, the serving gNodeB (200) configured to establish a RRC connection between the serving gNodeB (200) and the UE (100). In an embodiment, the RRC connection between the serving gNodeB (200) and the UE (100) based on at least one of a congestion at the gNodeB (200), a load at the gNodeB (200), and a permission by the gNodeB (200) to allow the RRC connection.

Further, the serving gNodeB (200) configures a connection bearer for the UE (100) for receiving the MBS session based on the received request for establishing MBS session. In an embodiment, the connection bearer is configured for the UE (100) by configuring one of the PTM bearer, the PTP bearer and the split MBS bearer for receiving the MBS session based on the received MBS access type.

Further, the serving gNodeB (200) is configured to establish the MBS session for the UE (100) on the configured connection bearer. The MBS session for the UE (100) is established by sending one of the PTM bearer configuration, the PTP bearer configuration and the split MBS bearer configuration to the UE (100) and establishing the MBS session based on one of the PTM configuration, the PTP bearer configuration, and the split MBS bearer configuration for the MBS.

Further, the gNodeB (200) is configured to receive a request for releasing the ongoing MBS session and remove the connection bearer configured for the ongoing MBS session in response to receiving the request for releasing the ongoing MBS session. In an embodiment, the request for releasing the ongoing MBS session includes a request for releasing an MBS access type associated with the ongoing MBS session, a first MBS access cause comprising one of a normal priority MBS access and a high priority MBS access associated with the ongoing MBS session, and a second MBS access cause indicating to release the ongoing MBS session. Further, the gNodeB (200) is configured to release the ongoing MBS session.

Further, the gNodeB (200) is configured to detect a predefined time period is lapsed after receiving request for release of a MBS session and remove the RRC connection between serving gNodeB (200) and UE (100) which was established in response to receiving RRC message. Further, the gNodeB (200) is configured to send a release message of the RRC connection to the UE.

Further, the gNodeB (200) is configured to receive a request for modifying the ongoing MBS session and reconfigure the connection bearer configured for the ongoing MBS session in response to receiving the request for modifying the ongoing MBS session.

In an embodiment, the request for modifying the ongoing MBS session includes a request for modifying an MBS access type associated with the ongoing MBS session, a first MBS access cause comprising one of a normal priority MBS access and a high priority MBS access associated with the ongoing MBS session, and a second MBS access cause indicating to modify the ongoing MBS session. Further, the gNodeB (200) is configured to modify the ongoing MBS session.

In an embodiment, the UE (100) is configured to send a request for establishing a MBS session included in a RRC message to the service gNodeB (200). In an embodiment, send the request for establishing the MBS session included in the RRC message to the service gNodeB (200) includes detect whether the UE (100) is in an idle state or inactive state, and perform one of send the request for establishing the MBS session included in a RRC setup request message to the serving gNodeB (200) in response to detecting that the UE is in the idle state, and send the request for establishing the MBS session included in a RRC resume request message to the service gNodeB (200) in response to detecting that the UE is in the inactive state. Further, the UE (100) is configured to receive a connection bearer configuration from the serving gNodeB (200) for receiving the MBS session based on the request for establishing MBS session after establishing a RRC connection between the serving gNodeB (200) and the UE (100). Further, the UE (100) is configured to receive the MBS session from the serving gNodeB (200) based on the connection bearer configuration. The connection bearer configuration is one of a PTM bearer configuration, a PTP bearer configuration and a split MBS bearer configuration. Further, the UE (100) is configured to access the MBS using the MBS session.

Further, the UE (100) is configured to send a request for releasing the ongoing MBS session. The request for releasing the ongoing MBS session includes a request for releasing an MBS access type associated with the ongoing MBS session, a first MBS access cause comprising one of a normal priority MBS access and a high priority MBS access associated with the ongoing MBS session, and a second MBS access cause indicating to release the ongoing MBS session.

In another embodiment, the UE (100) is configured to send a RRC message to establish the RRC connection with a service gNodeB (200). Further, the UE (100) is configured to send a NAS service request message and a NAS message to the AMF entity (300) through the serving gNodeB (200). The NAS service request message or NAS message comprises a request for establishing a MBS session. Further, the UE (100) is configured to establish the RRC connection with the serving gNodeB (200) in response to sending the RRC message. Further, the UE (100) is configured to receive the connection bearer configuration from the serving gNodeB (200) for receiving the MBS session based on the request for establishing MBS session. Further, the UE (100) is configured to receive the MBS session from the serving gNodeB (200) based on the connection bearer configuration. Further, the UE (100) is configured to access the MBS using the MBS session.

In another embodiment, the UE (100) is configured to establish a RRC connection with the serving gNodeB (200). Further, the UE (100) is configured to establish a MBS session for reception of MBS based on a connection bearer. The connection bearer is at least one of a PTM bearer configuration, a PTP bearer configuration, and a split MBS bearer configuration received from the serving gNodeB (200) after establishing the RRC connection. Further, the UE (100) is configured to detect switching at least one of a delivery mode and a cast type for the MBS. Further, the UE (100) is configured to detect whether a trigger condition is met. The trigger condition includes type of service, a signal strength measurement, a SINR, a channel quality, a BLER, a location of the UE (100), a mobility of UE (100) and UE preference and assistance information.

Further, the UE (100) is configured to trigger a service message to the serving gNodeB (200) to switch at least one of the delivery mode and the cast type in response to determining that the trigger condition is met. The service message is one of UE assistance information message, a UE information response message, a new RRC message, a MAC CE, a MBS interest indication message. The service message comprises an information element to indicate a cast type and a delivery mode preference of the UE (100) to avail the MBS, and an information element to indicate a service identity to avail the MBS. Further, the UE (100) indicates the preference based on at least one of PTM/PTP switch, and network configured conditions.

In an embodiment, the AMF entity (300) is configured to receive at least one of a Non Access Stratum (NAS) service request message and a NAS message from a User Equipment (UE) (100) through a serving gNodeB (200) associated with the UE (100). The NAS service request message or NAS message comprises a request for establishing a MBS session. Further, the AMF entity (300) is configured to detect whether a RRC connection is established between the serving gNodeB (200) and the UE (100). Further, the AMF entity (300) is configured to send a NAS service response message to the serving gNodeB (200) in response to detecting that the RRC connection is established between the serving gNodeB (200) and the UE (100). The NAS service response message includes an information element to indicate that the UE (100) is interested in receiving an ongoing MBS, and an information element to configure one of a PTM bearer, a PTP bearer, and a split MBS bearer for receiving a MBS session.

Further, the AMF entity (300) sends a MBS join indication to the serving gNodeB (200) using the NAS service response message. Further, the AMF entity (300) receives at least one of a NAS service request message and a NAS message from the UE (100) through the serving gNodeB (200), wherein the NAS service request message or NAS message comprises a request for releasing the ongoing MBS session. Further, the AMF entity (300) sends a NAS service response message to the serving gNodeB (200) to release the ongoing MBS session. Further, the AMF sends a MBS leave indication to the serving gNodeB (200) using the NAS service response message.

In another embodiment, the AMF entity (300) is configured to receive at least one of a NAS service request message and a NAS message from the UE (100) through a serving gNodeB (200) associated with the UE (100). The NAS service request message or NAS message includes a request for modifying a MBS session. Further, the AMF entity (300) is configured to detect whether a RRC connection is established between the serving gNodeB (200) and the UE (100). the AMF entity (300) is configured to send a NAS service response message to the serving gNodeB (200) in response to detecting that the RRC connection is established between the serving gNodeB (200) and the UE (100). The NAS service response message includes an information element to indicate that the UE (100) is requesting to modify an ongoing MBS, and an information element to configure or reconfigure one of a Point to Multipoint (PTM) bearer, a Point to Point (PTP) bearer, and a split MBS bearer for receiving a MBS session. The AMF entity (300) sends a MBS modification indication to the serving gNodeB (200) using the NAS service response message.

FIG. 2 shows various hardware components of the UE (100) for handling the MBS session in the wireless network system (1000), according to the embodiments as disclosed herein. In an embodiment, the UE (100) includes a processor (110), a communicator (120), a memory (130) and a MBS controller (140). The processor (110) is coupled with the communicator (120), the memory (130) and the MBS controller (140).

In an embodiment, the MBS controller (140) is configured to send the request for establishing the MBS session included in the RRC message to the service gNodeB (200). Further, the MBS controller (140) is configured to receive the connection bearer configuration from the serving gNodeB (200) for receiving the MBS session based on the request for establishing MBS session after establishing a RRC connection between the serving gNodeB (200) and the UE (100). Further, the MBS controller (140) is configured to receive the MBS session from the serving gNodeB (200) based on the connection bearer configuration. Further, the MBS controller (140) is configured to access the MBS using the MBS session. Further, the MBS controller (140) is configured to send the request for releasing the ongoing MBS session.

In another embodiment, the MBS controller (140) is configured to send the RRC message to establish the RRC connection with the service gNodeB (200). Further, the MBS controller (140) is configured to send the NAS service request message and the NAS message to the AMF entity (300) through the serving gNodeB (200). The NAS service request message or NAS message comprises a request for establishing a MBS session. Further, the MBS controller (140) is configured to establish the RRC connection with the serving gNodeB (200) in response to sending the RRC message. Further, the MBS controller (140) is configured to receive the connection bearer configuration from the serving gNodeB (200) for receiving the MBS session based on the request for establishing MBS session. Further, the MBS controller (140) is configured to receive the MBS session from the serving gNodeB (200) based on the connection bearer configuration. Further, the MBS controller (140) is configured to access the MBS using the MBS session.

In another embodiment, the MBS controller (140) is configured to establish the RRC connection with the serving gNodeB (200). Further, the MBS controller (140) is configured to establish a MBS session for reception of MBS based on a connection bearer. Further, the MBS controller (140) is configured to detect switching the delivery mode and the cast type for the MBS. Further, the MBS controller (140) is configured to detect whether a trigger condition is met. Further, the UE (100) is configured to trigger the service message to the serving gNodeB (200) to switch at least one of the delivery mode and the cast type in response to determining that the trigger condition is met. Further, the MBS controller (140) indicates the preference based on at least one of PTM/PTP switch, and network configured conditions.

The MBS controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning mechanism to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning mechanism is a method for training a predetermined target device (for example, a robot) using a plurality of learning data to cause, allow, or control the target device to make a determination or prediction. Examples of learning mechanisms include, but are not limited to, supervised learning, unsupervised learning, semi-supervised learning, or reinforcement learning.

Although the FIG. 2 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

FIG. 3 shows various hardware components of the gNodeB (200) for handling the MBS session in the wireless network system (1000), according to the embodiments as disclosed herein. In an embodiment, the serving gNodeB (200) includes a processor (210), a communicator (220), a memory (230) and a MBS controller (240). The processor (210) is coupled with the communicator (220), the memory (230) and the MBS controller (240).

In an embodiment, the MBS controller (240) is configured to receive the request for establishing the MBS session included in the RRC message. In response to receiving the RRC message, the MBS controller (240) is configured to establish the RRC connection between the serving gNodeB (200) and the UE (100). Further, the MBS controller (240) configures a connection bearer for the UE (100) for receiving the MBS session based on the received request for establishing MBS session.

Further, the MBS controller (240) is configured to establish the MBS session for the UE (100) on the configured connection bearer. The MBS session for the UE (100) is established by sending one of the PTM bearer configuration, the PTP bearer configuration and the split MBS bearer configuration to the UE (100) and establishing the MBS session based on one of the PTM configuration, the PTP bearer configuration, and the split MBS bearer configuration for the MBS.

Further, the MBS controller (240) is configured to receive the request for releasing the ongoing MBS session and remove the connection bearer configured for the ongoing MBS session in response to receiving the request for releasing the ongoing MBS session. Further, the MBS controller (240) is configured to release the ongoing MBS session.

Further, the MBS controller (240) is configured to detect the predefined time period is lapsed after receiving request for release of a MBS session and remove the RRC connection between serving gNodeB (200) and UE (100) which was established in response to receiving RRC message. Further, the MBS controller (240) is configured to send the release message of the RRC connection to the UE.

Further, the MBS controller (240) is configured to receive the request for modifying the ongoing MBS session and reconfigure the connection bearer configured for the ongoing MBS session in response to receiving the request for modifying the ongoing MBS session. Further, the MBS controller (240) is configured to modify the ongoing MBS session.

The MBS controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (210). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning mechanism to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning mechanism is a method for training a predetermined target device (for example, a robot) using a plurality of learning data to cause, allow, or control the target device to make a determination or prediction. Examples of learning mechanisms include, but are not limited to, supervised learning, unsupervised learning, semi-supervised learning, or reinforcement learning.

Although the FIG. 3 shows various hardware components of the gNodeB (200) but it is to be understood that other embodiments are not limited thereon. In other embodiments, the gNodeB (200) may include less or more number of components. Further, the labels or names of the components are used only for illustrative purpose and does not limit the scope of the invention. One or more components can be combined together to perform same or substantially similar function in the gNodeB (200).

FIG. 4 shows various hardware components of an AMF entity (300) for handling the MBS session in the wireless network system (1000), according to the embodiments as disclosed herein. In an embodiment, the AMF entity (300) includes a processor (310), a communicator (320), a memory (330) and a MBS controller (340). The processor (310) is coupled with the communicator (320), the memory (330) and the MBS controller (340).

In an embodiment, the MBS controller (340) is configured to receive the at least one of a NAS service request message and the NAS message from the UE (100) through a serving gNodeB (200) associated with the UE (100). The NAS service request message or NAS message comprises a request for establishing a MBS session. Further, the MBS controller (340) is configured to detect whether the RRC connection is established between the serving gNodeB (200) and the UE (100). Further, the MBS controller (340) is configured to send the NAS service response message to the serving gNodeB (200) in response to detecting that the RRC connection is established between the serving gNodeB (200) and the UE (100). The NAS service response message includes the information element to indicate that the UE (100) is interested in receiving an ongoing MBS, and the information element to configure one of the PTM bearer, the PTP bearer, and the split MBS bearer for receiving the MBS session. Further, the MBS controller (340) sends the MBS join indication to the serving gNodeB (200) using the NAS service response message.

Further, the AMF entity (300) receives the NAS service request message and the NAS message from the UE (100) through the serving gNodeB (200), wherein the NAS service request message or NAS message comprises the request for releasing the ongoing MBS session. Further, the MBS controller (340) sends the NAS service response message to the serving gNodeB (200) to release the ongoing MBS session. Further, the MBS controller (340) sends the MBS leave indication to the serving gNodeB (200) using the NAS service response message.

In another embodiment, the MBS controller (340) is configured to receive the NAS service request message and the NAS message from the UE (100) through the serving gNodeB (200) associated with the UE (100). The NAS service request message or NAS message includes the request for modifying a MBS session. Further, the MBS controller (340) is configured to detect whether the RRC connection is established between the serving gNodeB (200) and the UE (100). Further, the MBS controller (340) is configured to send the NAS service response message to the serving gNodeB (200) in response to detecting that the RRC connection is established between the serving gNodeB (200) and the UE (100). The NAS service response message includes the information element to indicate that the UE (100) is requesting to modify the ongoing MBS, and the information element to configure or reconfigure one of the PTM bearer, the PTP bearer, and the split MBS bearer for receiving the MBS session. The MBS controller (340) sends the MBS modification indication to the serving gNodeB (200) using the NAS service response message.

The MBS controller (340) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware Further, the processor (310) is configured to execute instructions stored in the memory (330) and to perform various processes. The communicator (320) is configured for communicating internally between internal hardware components and with external devices via one or more networks. The memory (330) also stores instructions to be executed by the processor (310). The memory (330) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (310). The processor (310) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning mechanism to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning mechanism is a method for training a predetermined target device (for example, a robot) using a plurality of learning data to cause, allow, or control the target device to make a determination or prediction. Examples of learning mechanisms include, but are not limited to, supervised learning, unsupervised learning, semi-supervised learning, or reinforcement learning.

Although the FIG. 4 shows various hardware components of the AMF entity (300) but it is to be understood that other embodiments are not limited thereon. In other embodiments, the AMF entity (300) may include less or more number of components. Further, the labels or names of the components are used only for illustrative purpose and does not limit the scope of the invention. One or more components can be combined together to perform same or substantially similar function in the AMF entity (300).

FIG. 5a-FIG. 5c are example flow charts (S500) illustrating a method, implemented by the serving gNodeB (200), for handling the MBS session in the wireless network system (1000), according to the embodiments as disclosed herein. The operations (S502-S528) are performed by the MBS controller (240).

Referring to FIG. 5a, at S502, the method includes receiving the request for establishing the MBS session included in the RRC message. At S504, the method includes establishing the RRC connection between the serving gNodeB (200) and the UE (100) in response to receiving the RRC message. At S506, the method includes configuring the connection bearer for the UE (100) for receiving the MBS session based on the received request for establishing MBS session. At S508, the method includes sending one of the PTM bearer configuration, the PTP bearer configuration and the split MBS bearer configuration to the UE (100). At S510, the method includes establishing the MBS session based on one of the PTM configuration, the PTP bearer configuration, and the split MBS bearer configuration for the MBS.

Referring to FIG. 5b, at S512, the method includes receiving the request for releasing the ongoing MBS session. At S514, the method includes removing the connection bearer configured for the ongoing MBS session in response to receiving the request for releasing the ongoing MBS session. At S516, the method includes releasing the ongoing MBS session. At S518, the method includes detecting that the predefined time period is lapsed after receiving request for release of the MBS session. At S520, the method includes removing the RRC connection between serving gNodeB (200) and the UE (100) which was established in response to receiving RRC message. At S522, the method includes sending the release message of the RRC connection to the UE (100).

Referring to FIG. 5c, at S524, the method includes receiving the request for modifying the ongoing MBS session. At S526, the method includes reconfiguring the connection bearer configured for the ongoing MBS session in response to receiving the request for modifying the ongoing MBS session. At S528, the method includes modifying the ongoing MBS session.

FIG. 6a-FIG. 6c are example flow charts (S600a) illustrating a method, implemented by the UE (100), for handling the MBS session in the wireless network system (1000), according to the embodiments as disclosed herein.

As shown in the FIG. 6a, the operations (S602a-S614a) are performed by the MBS controller (140). At S602a, the method includes detecting whether the UE (100) is in the idle state or the inactive state. If the UE (100) is in the inactive state then, at S604a, the method includes sending the request for establishing the MBS session included in the RRC resume request message to the service gNodeB (200). If the UE (100) is in the idle state then, at S606a, the method includes sending the request for establishing the MBS session included in the RRC setup request message to the serving gNodeB (200).

At S608a, the method includes receiving the connection bearer configuration from the serving gNodeB (200b) for receiving the MBS session based on the request for establishing MBS session after establishing a RRC connection between the serving gNodeB (200) and the UE (100). At 610a, the method includes receiving the MBS session from the serving gNodeB (200) based on the connection bearer configuration. At S612a, the method includes accessing the MBS using the MBS session. At S614a, the method includes sending the request for releasing the ongoing MBS session.

As shown in the FIG. 6b, the operations (S602b-S604b) are performed by the MBS controller (140). At S602b, the method includes detecting that the UE (100) is in the idle state and has the MBS session ongoing. At S604b, the method includes sending the request for releasing/modifying the MBS session included in the RRC setup request message to the serving gNodeB (200).

As shown in the FIG. 6c, the operations (S602c-S604c) are performed by the MBS controller (140). At S602c, the method includes detecting that the UE (100) is in the inactive state and has the MBS session ongoing. At S604c, the method includes sending the request for releasing/modifying the MBS session included in the RRC resume request message to the serving gNodeB (200).

FIG. 7 is an example flow chart (S700) illustrating a method, implemented by the AMF entity (300), for handling the MBS session in the wireless network system (1000), according to the embodiments as disclosed herein. The operations (S702-S712) are performed by the MBS controller (340).

At S702, the method includes receiving the NAS service request message or the NAS message from the UE (100) through the serving gNodeB (200) associated with the UE (100). The NAS service request message or the NAS message includes a request for establishing the MBS session. At S704, the method includes detecting whether a RRC connection is established between the serving gNodeB (200) and the UE (100). At S706, the method includes sending the NAS service response message to the serving gNodeB (200) in response to detecting that the RRC connection is established between the serving gNodeB (200) and the UE (100). The NAS service response message includes the information element to indicate that the UE (100) is interested in receiving the ongoing MBS, and the information element to configure the PTM bearer or the PTP bearer or the split MBS bearer for receiving the MBS session. At S708, the method includes receiving the NAS service request message or the NAS message from the UE (100) through the serving gNodeB (200), wherein the NAS service request message or the NAS message comprises the request for releasing the ongoing MBS session. At S710, the method includes sending the NAS service response message to the serving gNodeB (200) to release the ongoing MBS session. At S712, the method includes sending the MBS leave indication to the serving gNodeB (200) using the NAS service response message.

FIG. 8 is another example flow chart (S800) illustrating a method, implemented by the UE, for handling the MBS session in the wireless network system, according to the embodiments as disclosed herein. The operations (S802-S814) are performed by the MBS controller (140).

At S802, the method includes sending the RRC message to establish the RRC connection with the service gNodeB (200). At S804, the method includes sending the NAS service request message or the NAS message to the AMF entity (300) in the wireless network system (1000) through the serving gNodeB (200). The NAS service request message or the NAS message includes the request for establishing the MBS session. At S806, the method includes establishing the RRC connection with the serving gNodeB (200) in response to sending the RRC message. At S808, the method includes receiving the connection bearer configuration from the serving gNodeB (200) for receiving the MBS session based on the request for establishing MBS session. At S810, the method includes receiving the MBS session from the serving gNodeB (200) based on the connection bearer configuration. At S812, the method includes accessing the MBS using the MBS session. At S814, the method includes sending the request for releasing the ongoing MBS session.

FIG. 9 is an example flow chart (S900) illustrating a method, implemented by the UE (100), for handling the MBS session in the wireless network system (1000) by switching from the PTM bearer or the PTP or the split MBS bearer, according to the embodiments as disclosed herein. The operations (S902-S910) are performed by the MBS controller (140).

At S902, the method includes establishing, the RRC connection with the serving gNodeB (200). At S904, the method includes establishing the MBS session for reception of MBS based on a connection bearer. The connection bearer can be, for example, but not limited to the PTM bearer configuration, the PTP bearer configuration, and the split MBS bearer configuration received from the serving gNodeB (200) after establishing the RRC connection. At S906, the method includes detecting switching the delivery mode and the cast type for the MBS. At S908, the method includes detecting whether a trigger condition is met. At S910, the method includes triggering the service message to the serving gNodeB (200) to switch the delivery mode and the cast type in response to determining that the trigger condition is met, wherein the service message comprises an information element to indicate a cast type and a delivery mode preference of the UE (100) to avail the MBS, and an information element to indicate a service identity to switch at least one of the delivery mode and the cast type.

FIG. 10 is an example signaling diagram illustrating a scenario of Non Access Stratum (NAS) based indication of connection establishment cause, according to the embodiments as disclosed herein.

Referring to the FIG. 10, the NAS service request can indicate that the service request is for the MBS service. However, the service request is transparent to the RAN node and gNB simply passes this message to the AMF entity (300) without comprehending its contents. The only way the RAN node or gNB (200) can be made aware that the connection is for MBS, is by sending an indication from the AMF (300) to the gNB (200). This is done only after RRC connection is established successfully and service request is accepted. Therefore, the radio admission control cannot be done optimally in this method as RRC connection is already established. However, the gNB (200) still needs to know that the connection is intended for multicast/MBS sessions since it has to establish the PTM bearer towards the UE (100). Therefore, a new indication needs to be introduced in the N2 message from the AMF (300) to the gNB (200) to indicate that the UE (100) in connected state is interested to receive MBS service and then a PTM bearer needs to be established. Upon receiving this indication, the gNB (200) can signal the MBS configuration to the UE (100). In an embodiment, an indication/information element/field/bit is added in the N2 message in order to indicate that the UE (100) is interested in receiving an ongoing MBS service and to configure a PTM.

At S1002, the RRC connection is established between the UE (100) and the gNB (200). At S1004, the gNB (200) sends the service request including the MBS request indicator to the AMF entity (300). At S1006, the MBS control information is available at the UE (100). At S1008, the AMF entity (300) sends the N2 message or an initial UE setup with the MBS request indicator to the gNB (200). At S1010, the gNB (200) sends the PTM/PTP/split MBS bearer setup to the UE (100). At S1012, based on the PTM bearer setup, the MBS session is ongoing between the UE (100) and the gNB (200).

FIG. 11 is an example signaling diagram illustrating a scenario of new Radio Resource Control (RRC) establishment cause, according to the embodiments as disclosed herein. At S1102, the UE (100) sends the RRC setup request (e.g., Est cause MBS access) to the gNB (200). At S1104, the RRC connection is established between the UE (100) and the gNB (200). At S1106, the MBS control information is available at the UE (100). At S1108, the gNB (200) sends the PTM PTM/PTP/split MBS bearer setup to the UE (100). At S1110, the MBS session is ongoing between the UE (100) and the gNB (200).

Referring to the FIG. 11, the NAS based indication does not help in performing early radio admission control. The best way to make the gNB aware that of an attempted RRC connection for MBS is by indicating to gNB before connection establishment is completed. Once RRC setup complete message from UE is received by the gNB, the RRC connection is considered to be established successfully. Upon receiving an RRC connection request form a UE, the gNB identifies the reason for UE to establish connection using the establishment cause IE in the RRC message. Based on the establishment cause, and the availability of radio resources, the gNB decides to either admit the UE or to reject the connection request. The establishment cause also provides the gNB with enough knowledge to configure bearers to the UE.

Therefore, introducing an MBS specific establishment cause can help gNB perform radio admission control and bearer setup efficiently. Upon receiving connection request with MBS establishment cause, the gNB can setup the requisite PTM bears for the UE interested MBS services. In an embodiment, a new establishment cause is introduced in RRC setup request in order to indicate to the network that the connection request is for MBS access as illustrated.

MBS in NR is targeted to support a wide array of services like mission critical services, public safety, V2X, IoT applications, IPTV, group communications, software download etc. Some of these services like mission critical, V2X, public safety etc. are more time critical than others and they require quick and easy access to network resources in order to start receiving the multicast service. Therefore, it is useful to differentiate the MBS access type to normal priority access and high priority access to facilitate the network to take the appropriate decisions and actions. In an embodiment, 2 new establishment causes for MBS access are introduced in RRC setup request—one for normal priority access, and other for high priority access, as illustrated below.

```
-- ASN1START
-- TAG-RRCSETUPREQUEST-START
RRCSetupRequest :: = SEQUENCE {
rrcSetupRequestRRCSetupRequest-IEs
}
RRCSetupRequest-IEs :: = SEQUENCE {
ue-Identity InitialUE-Identity,
establishmentCauseEstablishmentCause,
spare BIT STRING (SIZE (1))
}
InitialUE-Identity :: = CHOICE {
ng-5G-S-TMSI-Part1 BIT STRING (SIZE (39)),
random Value BIT STRING (SIZE (39))
EstablishmentCause :: = ENUMERATED {
emergency, highPriorityAccess, mt-Access, mo-Signalling,
mo-Data, mo-VoiceCall, mo-VideoCall, mo-SMS, mps-PriorityAccess,
mcs-Priority Access,
  mbsAccess, highPriorityMbsAcces, spare4, spare3, spare2, spare1 }
-- TAG-RRCSETUPREQUEST-STOP
-- ASN1STOP
```

FIG. 12 is an example signaling diagram illustrating a scenario of User Equipment (UE) autonomous assistance to switch from PTM to PTP and vice versa, according to the embodiments as disclosed herein. At S1202, the RRC connection is established between the UE (100) and the gNB (200). At S1204, the MBS control information is available at the UE (100). At S1206, the gNB (200) sends the PTM/

PTM/PTP/split MBS bearer setup to the UE (100). At S1208, the MBS session is ongoing between the UE (100) and the gNB (200). At S1210, the UE (100) interested in the new service. At S1212, the UE (100) exceeds the MBS Rx capability/other trigger conditions. At S1214, the UE (100) sends the cast type/delivery mode switch request (includes service ID) (e.g., new message/UE assistance information) to the gNB (200).

Referring to the FIG. 12, not all the UEs that support MBS reception are equally capable. Some UEs may support simultaneous reception of multiple MBS services, while some others may support simultaneous reception of MBS(s) and unicast services. There could also be some UEs which does not support simultaneous reception of MBS and unicast services. It is possible that some UEs support upto 2 simultaneous MBS service reception while some might be capable of receiving more. In cases where the UE can no longer support simultaneous MBS reception of additional MBS services i.e. either UE does not support simultaneous MBS service reception or the UE already has maximum simultaneous MBS service active, the UE may need to receive any additional service via unicast. In such cases, it is beneficial to allow the UE to indicate that it prefers to receive a certain service that is multicast on that cell, in a unicast manner i.e. setup a unicast session for this service. This indication can be sent to the network as a new IE in the UE assistance information. This assistance information may further indicate the index or session id for the MBS service that is desired to be received over unicast methods. In an embodiment, a UE indicates the service id or session ID which it prefers to receive in a unicast method as illustrated.

FIG. 13 is another example signaling diagram illustrating a UE assistance to switch from PTM to PTP and vice versa based on a trigger and configuration from network, according to the embodiments as disclosed herein. At S1302, the RRC connection is established between the UE (100) and the gNB (200). At S1304, the MBS control information is available at the UE (100). At S1306, the gNB (200) sends the configuration to request cat type change/delivery mode switch (e.g., RRC reconfiguration/other configuration/UE information request) to the UE (100). At S1308, the gNB (200) sends the PTM/PTM/PTP/split MBS bearer setup to the UE (100). At S1310, the MBS session is ongoing between the UE (100) and the gNB (200). At S1312, the UE (100) interested in the new service. At S1314, the UE (100) exceeds the MBS Rx capability/other trigger conditions. At S1316, the UE (100) sends the cast type/delivery mode switch request (includes service ID) (e.g., new message/UE assistance information) to the gNB (200).

Referring to the FIG. 13, the UE assistance as indicated earlier is a UE autonomous decision to request the network to provide a service in a unicast method. Alternatively, it is also possible for network to configure a UE allowing it to send cast type/delivery mode preference indicator to the network. This configuration may further include the trigger upon which the UE may send this preference indication. The trigger conditions may include high error or Block Error Rate (BLER) in order to improve reception quality, limited UE capability if the UE is not capable to receive any additional multicast session or is operating at maximum capability, or can send the preference without any reason. This configuration and trigger condition can be signaled to the UE using a new RRC message or using UE information request or as part of other config in RRC reconfiguration message. The UE upon fulfilling any of the configured trigger condition sends the preference indication to the network and optionally includes the trigger condition that lead to sending of the preference indication. This preference indication includes the service id and optionally the cast type or delivery mode in order to indicate to gNB if multicast of unicast reception is desired for a service.

This preference indication can be sent to the network either via UE assistance information, or UE information response, or as a new RRC message, or as Medium Access Control Element (MAC CE). In an embodiment, network configures the UE to indicate cast type and delivery mode preference to network based on a configured condition. In another embodiment, the UE indicates it cast type or delivery mode preference for a particular MBS service as illustrated.

FIG. 14 is an example flow chart (S1400) illustrating a method, implemented by the AMF entity (300), for handling the MBS session in the wireless network system (1000) based on the NAS service request message or the NAS message including the request for modifying the MBS session, according to the embodiments as disclosed herein. The operations (S1402-S1406) are performed by the MBS controller (340).

At S1402, the method includes receiving the NAS service request message or the NAS message from the UE (100) through the serving gNodeB (200) associated with the UE (100). The NAS service request message or the NAS message includes the request for modifying the MBS session. At S1404, the method includes detecting whether the RRC connection is established between the serving gNodeB (200) and the UE (100). At S1406, the method includes sending the NAS service response message to the serving gNodeB (200) in response to detecting that the RRC connection is established between the serving gNodeB (200) and the UE (100). The NAS service response message includes an information element to indicate that the UE (100) is requesting to modify the ongoing MBS, and an information element to configure or reconfigure one of the PTM bearer, the PTP bearer, and the split MBS bearer for receiving a MBS session.

FIG. 15 is a diagram illustrating a UE 1500 according to an embodiment of the present disclosure.

Referring to the FIG. 15, the UE (1500) may include a processor (1510), a transceiver (1520) and a memory (1530). However, all of the illustrated components are not essential. The UE (1500) may be implemented by more or less components than those illustrated in the FIG. 15. In addition, the processor (1510) and the transceiver (1520) and the memory (1530) may be implemented as a single chip according to another embodiment.

The aforementioned components will now be described in detail.

The processor (1510) may include one or more processors or other processing devices that control the proposed function, process, and/or method. Operation of the UE (1500) may be implemented by the processor (1510).

The transceiver (1520) may be connected to the processor (1510) and transmit and/or receive a signal. In addition, the transceiver (1520) may receive the signal through a wireless channel and output the signal to the processor (1510). The transceiver (1520) may transmit the signal output from the processor (1510) through the wireless channel.

The memory (1530) may store the control information or the data included in a signal obtained by the UE (1500). The memory (1530) may be connected to the processor (1510) and store at least one instruction or a protocol or a parameter for the proposed function, process, and/or method. The memory (1530) may include read-only memory (ROM)

and/or random access memory (RAM) and/or hard disk and/or CD-ROM and/or DVD and/or other storage devices.

FIG. 16 is a diagram illustrating a base station 1600 according to an embodiment of the present disclosure.

Referring to the FIG. 16, the base station 1600 may include a processor (1610), a transceiver (1620) and a memory (1630). However, all of the illustrated components are not essential. The base station (1600) may be implemented by more or less components than those illustrated in FIG. 16. In addition, the processor (1610) and the transceiver (1620) and the memory (1630) may be implemented as a single chip according to another embodiment.

The aforementioned components will now be described in detail.

The processor (1610) may include one or more processors or other processing devices that control the proposed function, process, and/or method. Operation of the base station (1600) may be implemented by the processor (1610).

The transceiver (1620) may be connected to the processor (1610) and transmit and/or receive a signal. The signal may include control information and data. In addition, the transceiver (1620) may receive the signal through a wireless channel and output the signal to the processor (1610). The transceiver (1620) may transmit a signal output from the processor (1610) through the wireless channel.

The memory (1630) may store the control information or the data included in a signal obtained by the base station (1600). The memory (1630) may be connected to the processor (1610) and store at least one instruction or a protocol or a parameter for the proposed function, process, and/or method. The memory (1630) may include read-only memory (ROM) and/or random access memory (RAM) and/or hard disk and/or CD-ROM and/or DVD and/or other storage devices.

The processor (1610) may receive, from a network entity via the transceiver (1620), information indicating that a terminal is to join or leave a multicast and broadcast service (MBS) session in response to a message transmitted from the terminal to the network entity. For example, the message may indicate that the terminal joins or leaves the MBS session using non access stratum (NAS) signaling.

In an embodiment, the information may indicate when the terminal leaves the MBS session. In an embodiment, a MBS interest indication is supported by the terminal in a connected mode.

FIG. 17 schematically illustrates a core network entity according to embodiments of the present disclosure.

The core network entity 1700 may comprise the AMF entity described above.

Referring to the FIG. 17, the core network entity (1700) may include a processor (1710), a transceiver (1720) and a memory (1730). However, all of the illustrated components are not essential. The core network entity (1700) may be implemented by more or less components than those illustrated in FIG. 17. In addition, the processor (1710) and the transceiver (1720) and the memory (1730) may be implemented as a single chip according to another embodiment.

The aforementioned components will now be described in detail.

The transceiver (1720) may provide an interface for performing communication with other devices in a network. That is, the transceiver (1720) may convert a bitstream transmitted from the core network entity (1700) to other devices to a physical signal and covert a physical signal received from other devices to a bitstream. That is, the transceiver (1720) may transmit and receive a signal. The transceiver (1720) may be referred to as modem, transmitter, receiver, communication unit and communication module. The transceiver (1720) may enable the core network entity (1700) to communicate with other devices or system through backhaul connection or other connection method.

The memory (1730) may store a basic program, an application program, configuration information for an operation of the core network entity (1700). The memory (1730) may include volatile memory, non-volatile memory and a combination of the volatile memory and the non-volatile memory. The memory (1730) may provide data according to a request from the processor (1710).

The processor (1710) may control overall operations of the core network entity (1700). For example, the processor (1710) may transmit and receive a signal through the transceiver (1720). The processor (1710) may include at least one processor. The processor (1710) may control the core network entity (1700) to perform operations according to embodiments of the present disclosure.

The processor (1710) may receive, from a network entity via the transceiver (1720), information indicating that a terminal is to join or leave a multicast and broadcast service (MBS) session in response to a message transmitted from the terminal to the network entity.

In an embodiment, the message may indicate that the terminal joins or leaves the MBS session using non access stratum (NAS) signaling. In an embodiment, the information may indicate when the terminal leaves the MBS session. In an embodiment, a MBS interest indication is supported by the terminal in a connected mode.

FIG. 18 is a flow chart illustrating a method performed by a network entity according to an embodiment of the disclosure.

In step 1801, the network entity may receive, from the terminal, a message including that the terminal joins or leaves a multicast and broadcast service (MBS) session using non access stratum (NAS) signaling. For example, the message may include session join/leave indications indicating that the terminal joins or leaves the MBS session.

In step 1803, the network may transmit, to a base station, information indicating that the terminal is to join or leave the MBS session based on the message. In an embodiment, the information may indicate when the terminal leaves the MBS session.

In an embodiment, a procedure associated with the message is transparent to the base station. For example, the base station may relay the message from the terminal to the network entity without identifying or comprehending the session join/leave indications in the message. When the base station receives the information from the network entity, the base station may identify when the terminal leaves the MBS session. By notifying when the terminal leaves the MBS session to the base station via the information transmitted from the network entity, the base station may not waste resources on such terminal.

In an embodiment, a MBS interest indication is supported by the terminal in a connected mode. For example, the MBS interest indication is not supported by the terminal in an idle mode.

FIG. 19 is a flow chart illustrating a method performed by a base station according to an embodiment of the disclosure.

In step 1901, the base station may receive, from the network entity, information indicating that the terminal is to join or leave a multicast and broadcast service (MBS) session in response to a message transmitted from the terminal to the network entity. The message may indicate that the terminal joins or leaves the MBS session using non access stratum (NAS) signaling. In an embodiment, the information may indicate when the terminal leaves the MBS session.

In an embodiment, a procedure associated with the message is transparent to the base station. For example, the base station may relay the message from the terminal to the network entity without identifying or comprehending the session join/leave indications in the message. When the base station receives the information from the network entity, the base station may identify when the terminal leaves the MBS session. By notifying when the terminal leaves the MBS session to the base station via the information transmitted from the network entity, the base station may not waste resources on such terminal.

In an embodiment, a MBS interest indication is supported by the terminal in a connected mode. For example, the MBS interest indication is not supported by the terminal in an idle mode.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

The various actions, acts, blocks, steps, or the like in the flow charts may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a base station in a wireless communication system, the method comprising:
   receiving, from an access and mobility function (AMF) entity, an N2 message associated with a request for a multicast and broadcast service (MBS) service;
   transmitting, to a user equipment (UE), a message including an MBS radio bearer configuration associated with a point to multipoint (PTM) transmission mode;
   transmitting, to the UE, MBS data via an MBS radio bearer with the PTM transmission mode;
   transmitting, to the UE, a message including information associated with a condition related to a reception quality;
   receiving, from the UE, a message related to an MBS transmission mode, based on the information associated with the condition; and
   switching from the PTM transmission mode to a point to point (PTP) transmission mode and transmitting, to the UE, MBS data with the PTP transmission mode.

2. The method of claim 1, further comprising:
   receiving, from the AMF entity, an N2 message including an MBS leave indication.

3. The method of claim 1, wherein the N2 message is received in response to a non-access stratum (NAS) message associated with the request for the MBS service.

4. A base station in a wireless communication system, the base station comprising:
   at least one transceiver;
   at least one processor communicatively coupled to the at least one transceiver; and
   at least one memory communicatively coupled to the at least one processor, storing instructions executable by the at least one processor to cause the base station to:
      receive, from an access and mobility function (AMF) entity, an N2 message associated with a request for a multicast and broadcast service (MBS) service,
      transmit, to a user equipment (UE), a message including an MBS radio bearer configuration associated with a point to multipoint (PTM) transmission mode,
      transmit, to the UE, MBS data via an MBS radio bearer with the PTM transmission mode, transmit, to the UE, a message including information associated with a condition related to a reception quality,
receive, from the UE, a message related to an MBS transmission mode, based on the information associated with the condition, and
switch from the PTM transmission mode to a point to point (PTP) transmission mode and transmit, to the UE, MBS data with the PTP transmission mode.

5. The base station of claim 4, wherein the base station is further caused to:
receive, from the AMF entity, an N2 message including an MBS leave indication.

6. The base station of claim 4, wherein the N2 message is received in response to a non-access stratum (NAS) message is associated with the request for the MBS service.

7. A method performed by a user equipment (UE) in a wireless communication system, the method comprising:
transmitting, to an access and mobility management function (AMF) entity, a non-access stratum (NAS) message associated with a request for a multicast and broadcast service (MBS) service;
receiving, from a base station, a message including an MBS radio bearer configuration associated with a point to multipoint (PTM) transmission mode;
receiving, from the base station, MBS data via an MBS radio bearer with the PTM transmission mode;
receiving, from the base station, a message including information associated with a condition related to a reception quality;
in case that the condition is fulfilled, transmitting to the base station, a message related to an MBS transmission mode; and
receiving, from the base station, MBS data with a point to point (PTP) transmission mode.

8. The method of claim 7, further comprising:
transmitting, to the AMF entity, a NAS message associated with a request for leaving an MBS session.

9. The method of claim 7, wherein the MBS radio bearer configuration is related to the request for the MBS service.

10. A user equipment (UE) in a wireless communication system, the UE comprising:
at least one transceiver;
at least one processor communicatively coupled to the at least one transceiver; and
at least one memory communicatively coupled to the at least one processor, storing instructions executable by the at least one processor to cause the UE to:
transmit, to an access and mobility management function (AMF) entity, a non-access stratum (NAS) message associated with a request for a multicast and broadcast service (MBS) service,
receive, from a base station, a message including an MBS radio bearer configuration associated with a point to multipoint (PTM) transmission mode,
receive, from the base station, MBS data via an MBS radio bearer with the PTM transmission mode,
receive, from the base station, a message including information associated with a condition related to a reception quality,
in case that the condition is fulfilled, transmit to the base station, a message related to an MBS transmission mode, and
receive, from the base station, MBS data with a point to point (PTP) transmission mode.

11. The UE of claim 10, wherein the UE is further caused to:
transmit, to the AMF entity, a NAS message associated with a request for leaving an MBS session.

12. The UE of claim 10, wherein the MBS radio bearer configuration is related to the request for the MBS service.

* * * * *